United States Patent
Kim

(10) Patent No.: US 7,239,302 B2
(45) Date of Patent: Jul. 3, 2007

(54) POINTING DEVICE AND SCANNER, ROBOT, MOBILE COMMUNICATION DEVICE AND ELECTRONIC DICTIONARY USING THE SAME

(76) Inventor: In-Gwang Kim, 233-10, Sangdo-4dong, Tangjagku, Seoul (KR)

( * ) Notice: Subject to any disclaimer, the term of this patent is extended or adjusted under 35 U.S.C. 154(b) by 303 days.

(21) Appl. No.: 10/653,277

(22) Filed: Aug. 27, 2003

(65) Prior Publication Data

US 2004/0041798 A1  Mar. 4, 2004

(30) Foreign Application Priority Data

| Aug. 30, 2002 | (KR) | ...................... 10-2002-0051717 |
| Dec. 4, 2002 | (KR) | ...................... 10-2002-0076492 |
| Feb. 19, 2003 | (KR) | ...................... 10-2003-0010241 |

(51) Int. Cl.
    *G09G 5/08*       (2006.01)
(52) U.S. Cl. ...................................................... 345/165
(58) Field of Classification Search ................ 345/156, 345/158, 163–166, 169, 183, 179; 178/18.01–18.08; 455/556.1, 575.3, 556.2; 382/312–314
    See application file for complete search history.

(56) References Cited

U.S. PATENT DOCUMENTS

| 5,802,536 | A  | * | 9/1998  | Yoshii et al. ................ 715/532 |
| 6,084,574 | A  | * | 7/2000  | Bidiville ....................... 345/166 |
| 6,498,604 | B1 | * | 12/2002 | Jensen .......................... 345/179 |
| 6,657,618 | B2 | * | 12/2003 | Moore .......................... 345/179 |
| 6,768,911 | B2 | * | 7/2004  | Hino et al. ............... 455/552.1 |
| 6,788,960 | B2 | * | 9/2004  | Masutani et al. ......... 455/556.1 |
| 6,906,699 | B1 | * | 6/2005  | F.ang.hraeus et al. ........ 345/157 |
| 6,950,093 | B2 | * | 9/2005  | Song ............................ 345/163 |
| 2003/0045203 | A1 | * | 3/2003 | Sabe et al. ................... 446/356 |

* cited by examiner

*Primary Examiner*—Amr A. Awad
*Assistant Examiner*—Stephen G. Sherman
(74) *Attorney, Agent, or Firm*—Lerner, David, Littenberg, Krumholz & Mentlik, LLP

(57) ABSTRACT

A pointing device is disclosed which does not require a tablet, such as a digitizer, and is mechanically simplified, and a scanner, a robot, a mobile communication device and an electronic dictionary using the pointing device. The pointing device includes a light source, a ball and an optical image sensor. The light source irradiates light. The ball rotates by the movement of the entire pointing device. The optical image sensor detects the movement of the pointing device using an image. The pointing device irradiate light onto the ball through the light source, acquires an image on a surface of the ball through the optical image sensor, and outputs data on movement direction and distance by comparing and analyzing previous and current images.

14 Claims, 25 Drawing Sheets

[ FIG1 ]
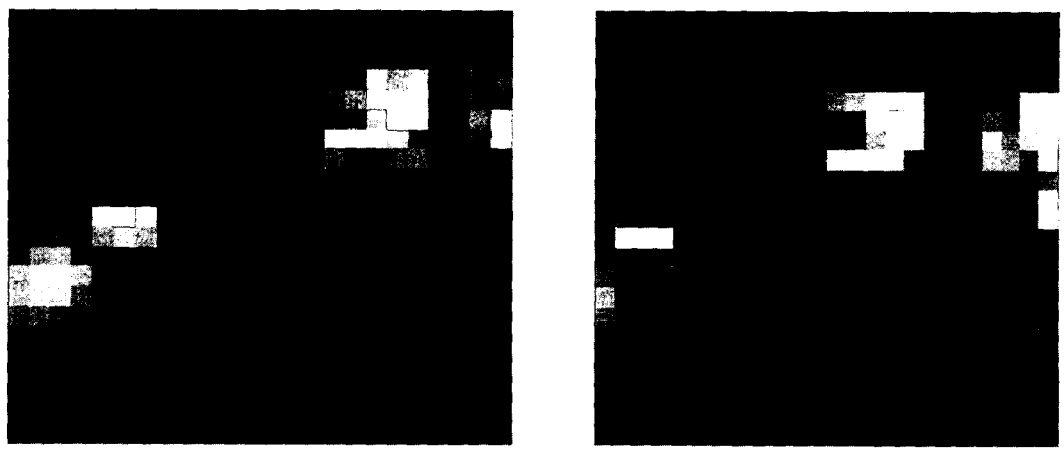
A. Image at t = 0 ms
B. Image at t = 0.67 ms
[ FIG2 ]
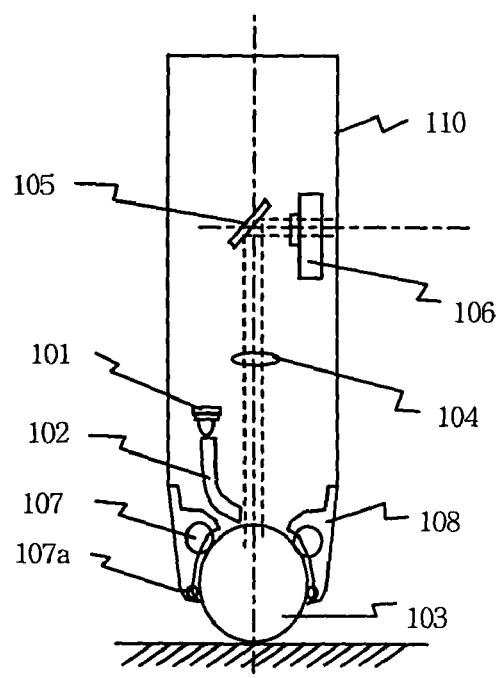

【 FIG3 】
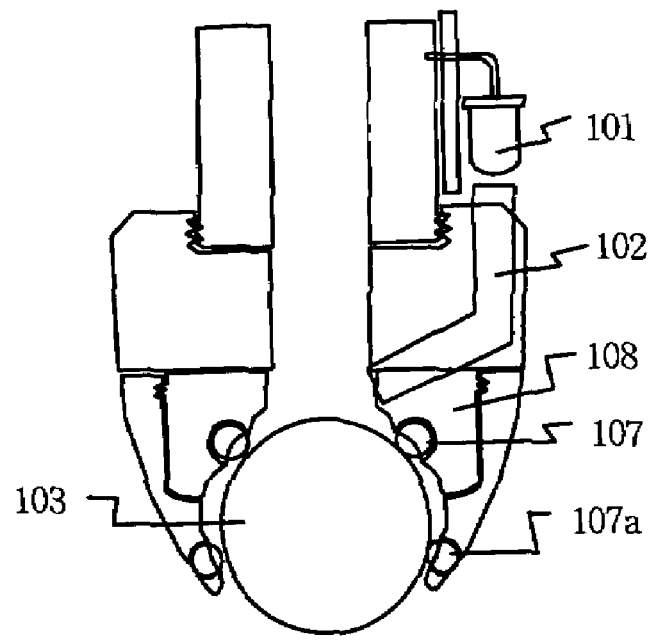
(a)
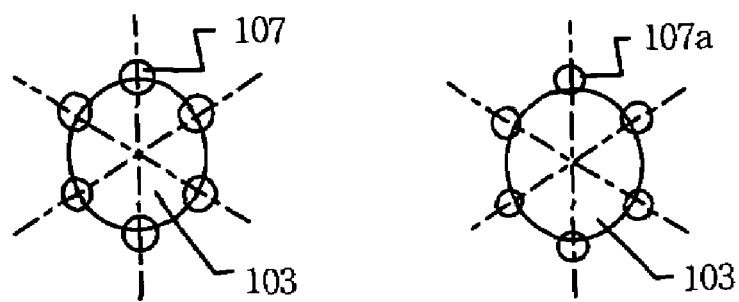
(b)

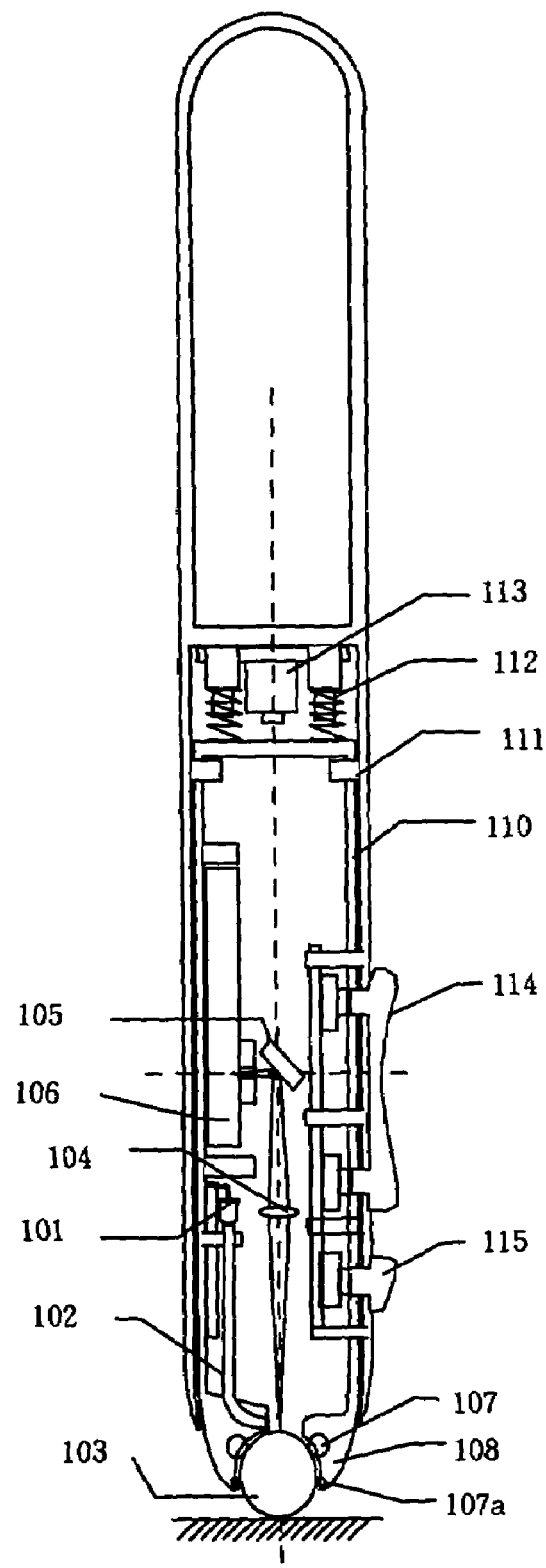
【 FIG5 】

[ FIG6 ]
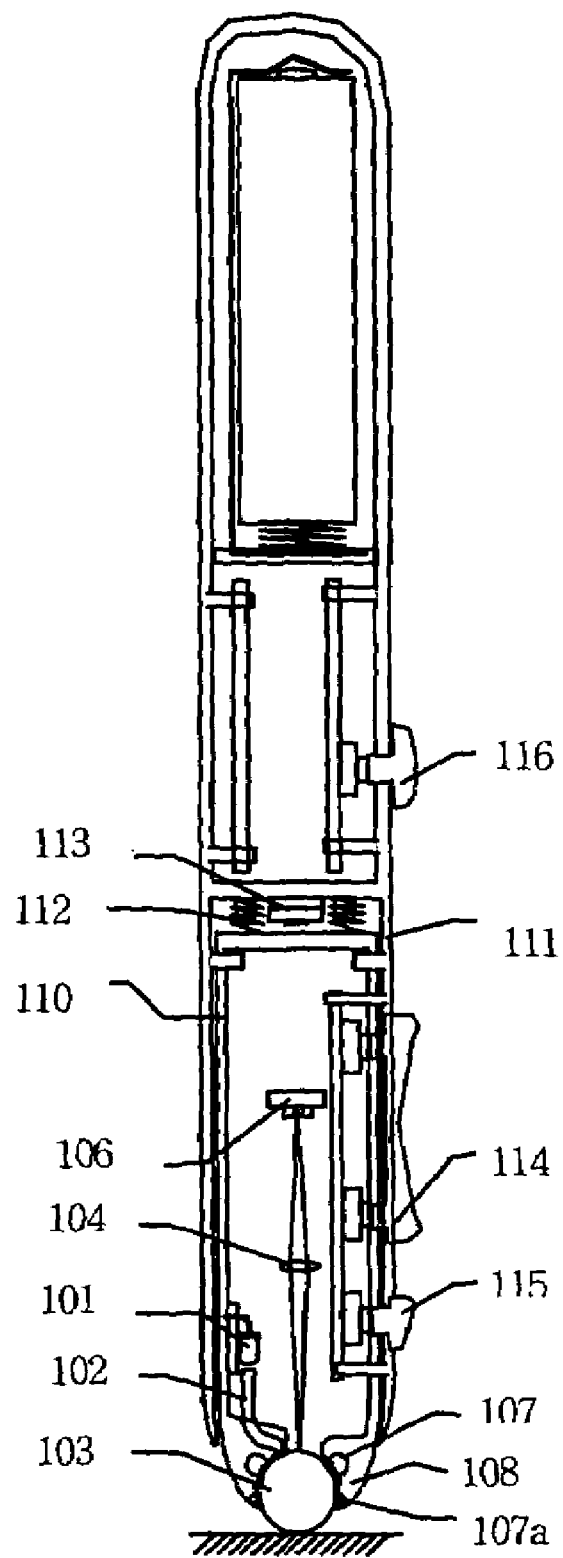

【 FIG7 】
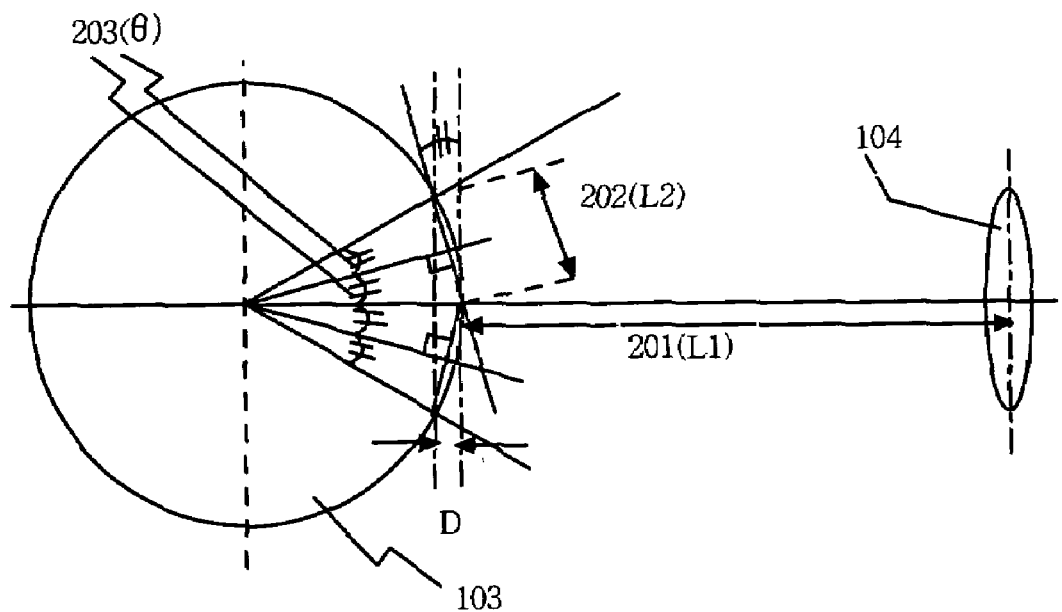
【 FIG8 】
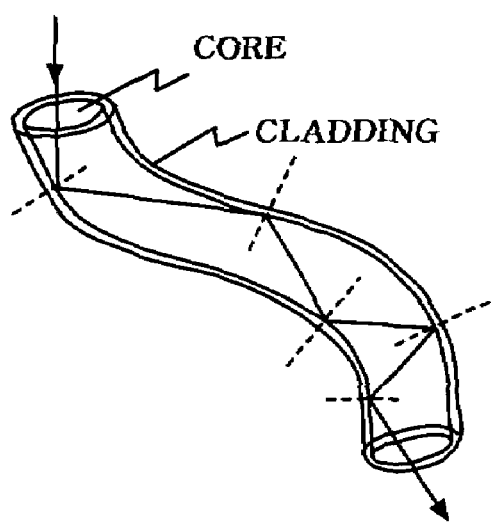

[ FIG9 ]
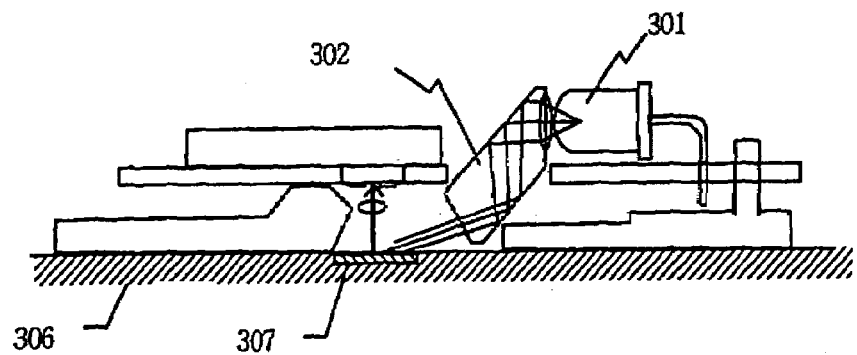
[ FIG10 ]
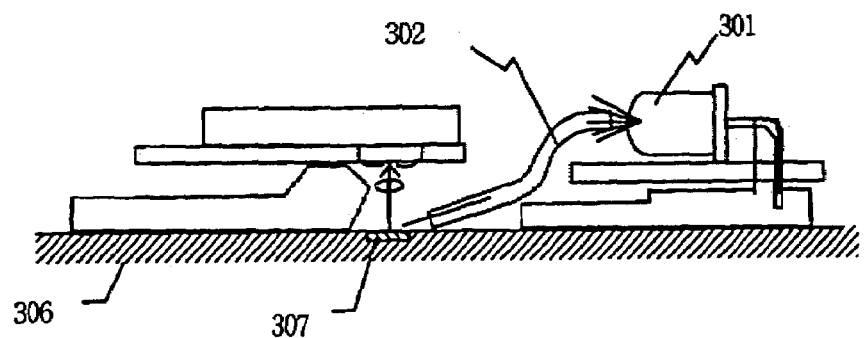
[ FIG11 ]
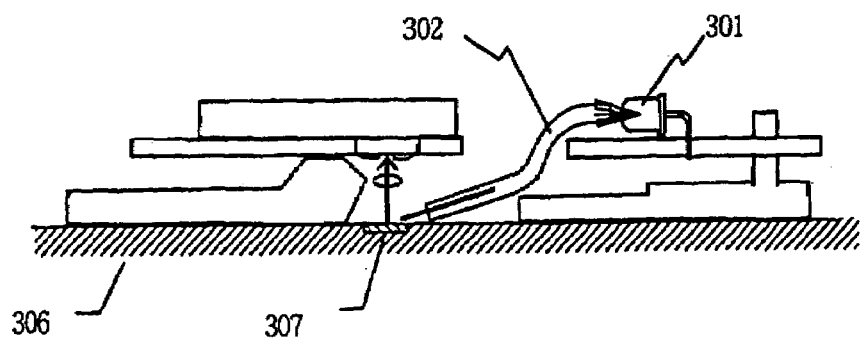

[ FIG12 ]
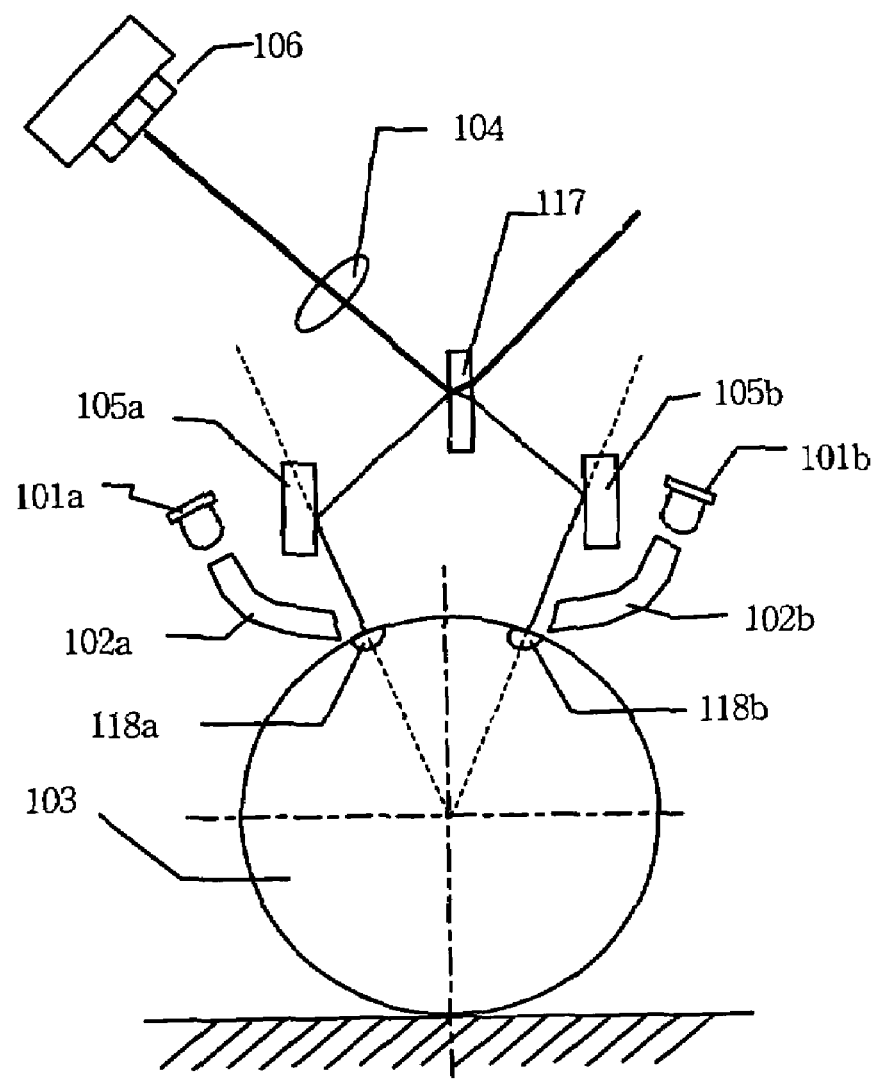

【 FIG13 】
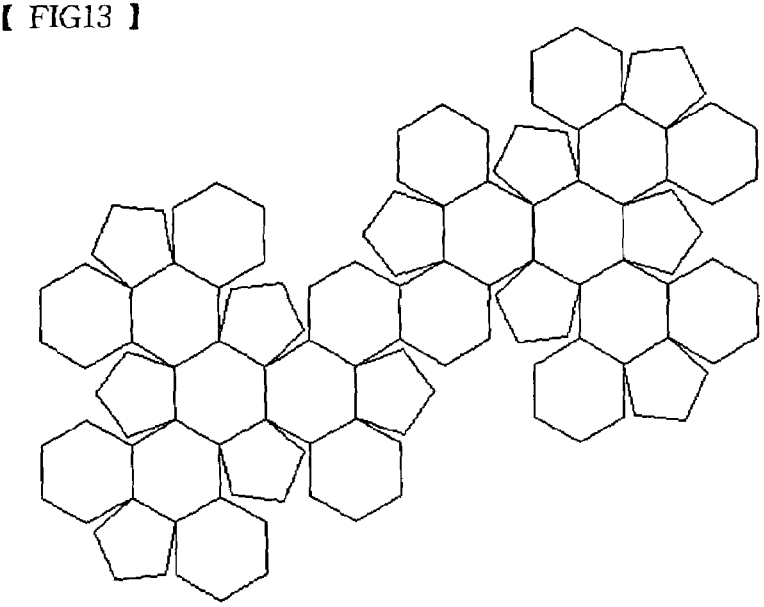
【 FIG14 】
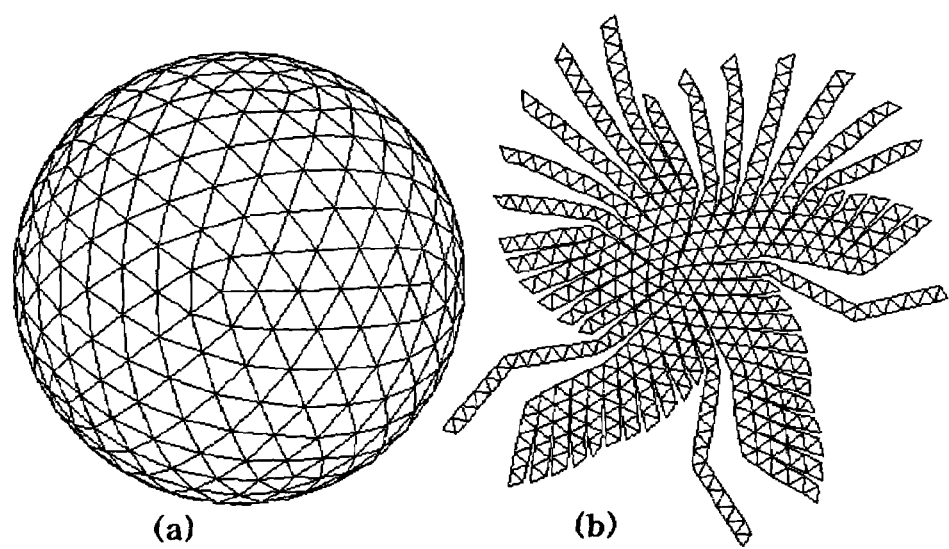
(a)　　　　　　　　　(b)

【 FIG15 】
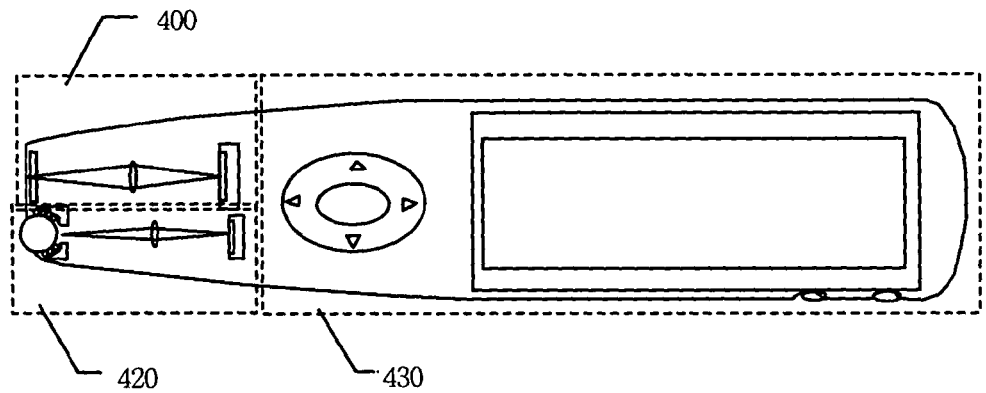
【 FIG16 】
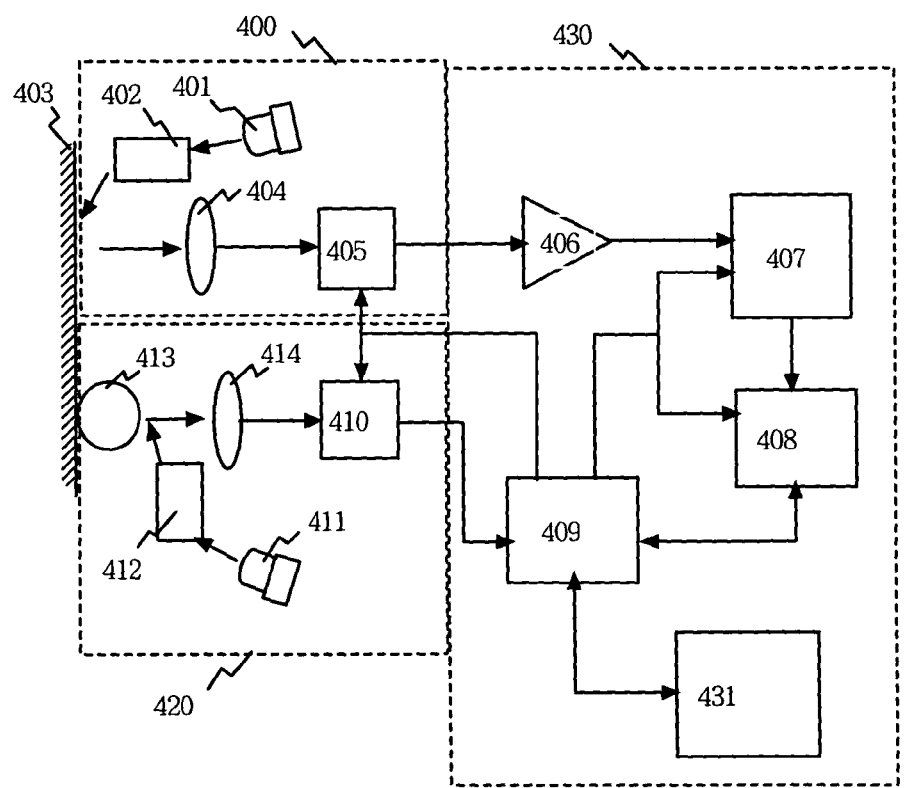

【 FIG17 】
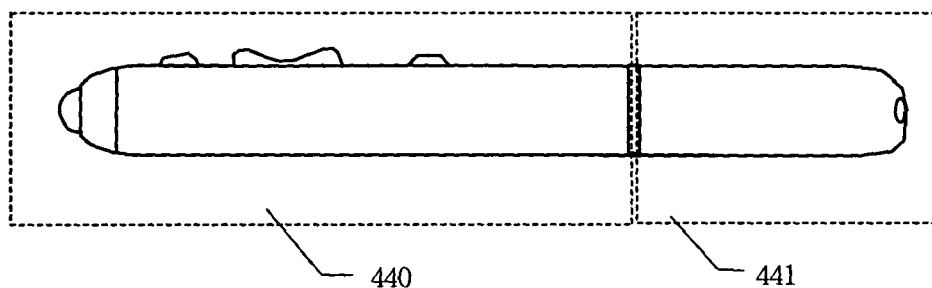
【 FIG18 】
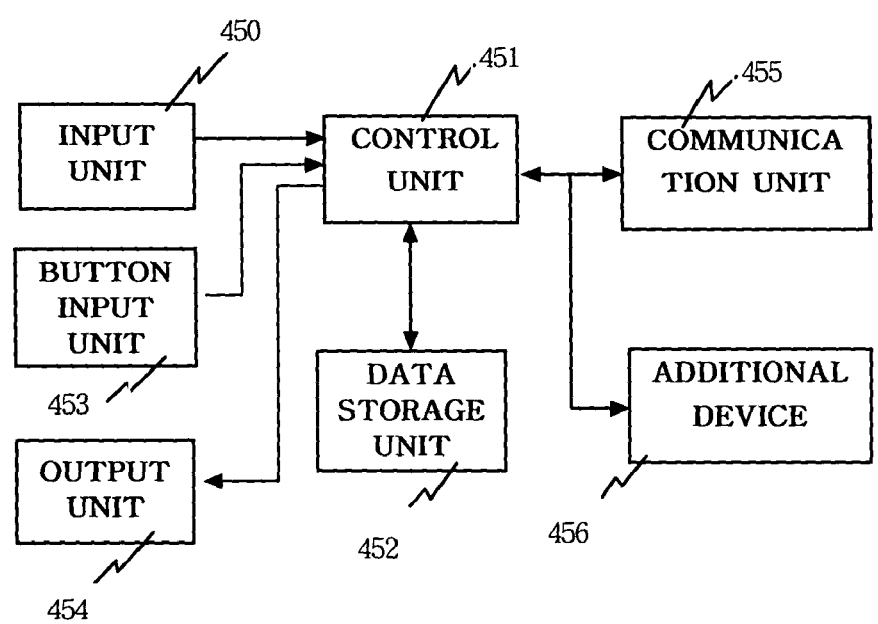

【 FIG19 】
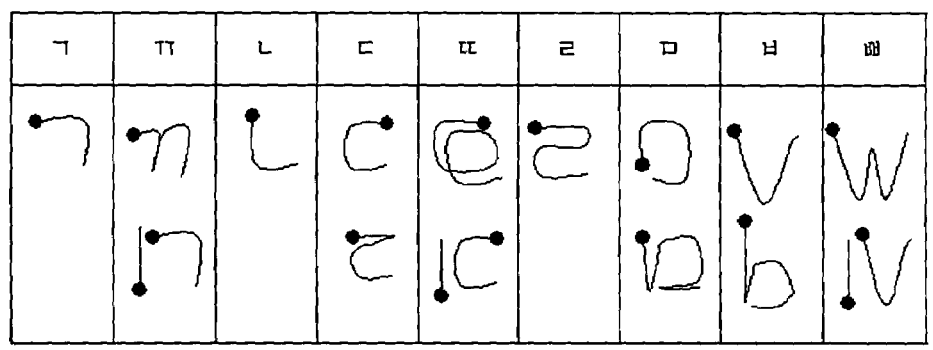
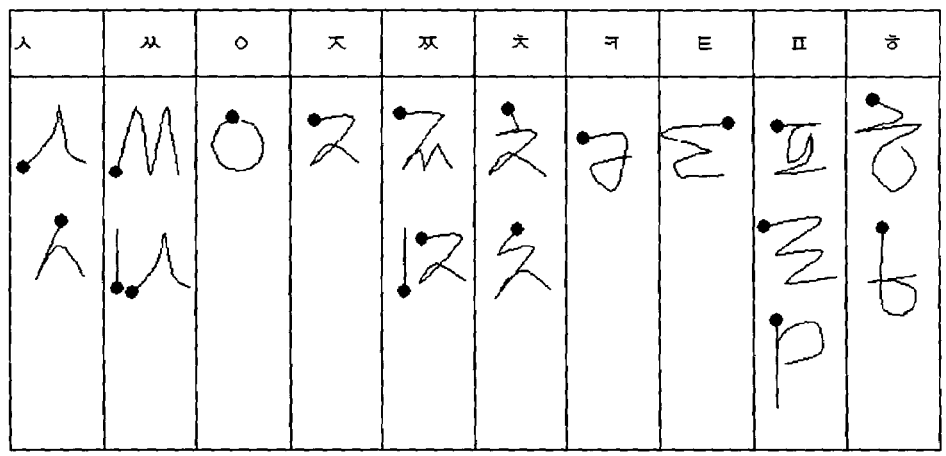

[ FIG20 ]

hand written (hand written)

[ FIG21 ]

| CONVERSION TO HANGUL MODE | ||O  ||R | CONVERSION TO ENGLISH MODE | ||↑  ||e | CONVERSION TO NUMERAL MODE | ||2  ||m | CONVERSION TO SPECIAL CHARACTER MODE | ||3  ||S |
|---|---|---|---|---|---|---|---|
| Caps Lock | ||| | DELETE | —• | RETURN KEY | ⌐ | NEXT, DOWN SELECTION | —▷ |
| PREVIOUS, UP SELECTION | ◁— | SEARCH | ⋈ | SEND | W | | |

[ FIG22 ]

| letter | shape | letter | shape |
|---|---|---|---|
| A | a A A A | N | n n N |
| B | b B | O | O O |
| C | C | P | p |
| D | d D d | Q | q q O |
| E | e E | R | r R |
| F | f f | S | S |
| G | g g G | T | t n |
| H | h h | U | u U |
| I | i | V | v v |
| J | J | W | w |
| K | k k d | X | x |
| L | l L | Y | y y |
| M | m m M | Z | Z z |

【 FIG23 】
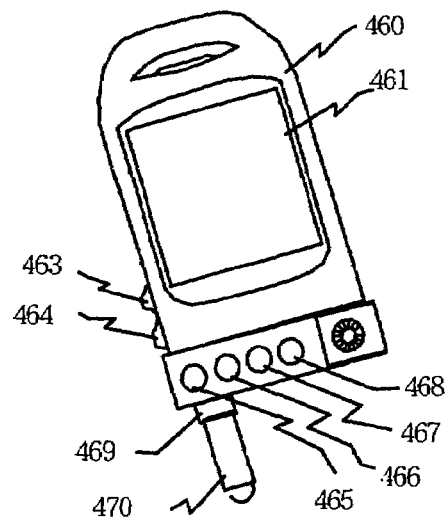
【 FIG24 】
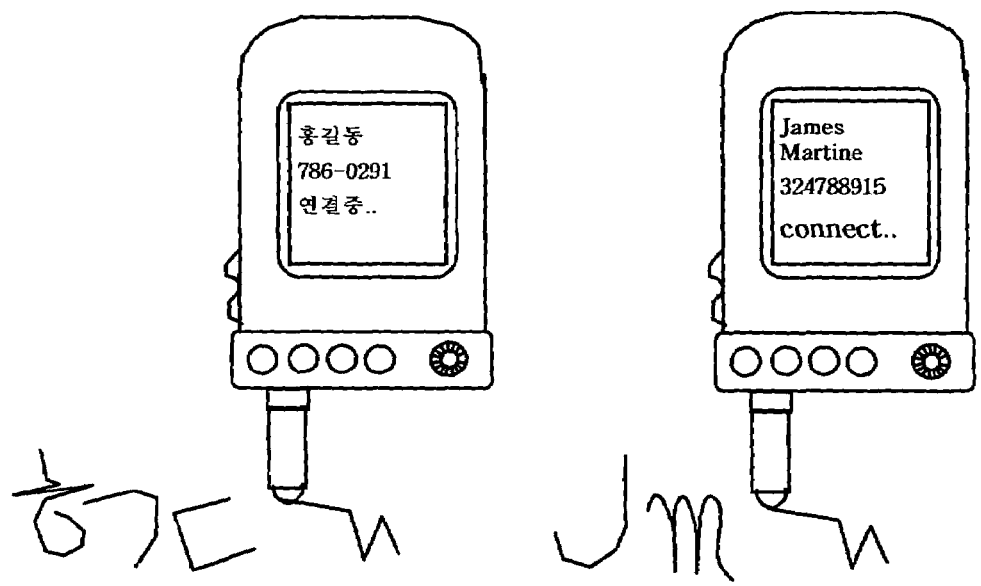

【 FIG25 】
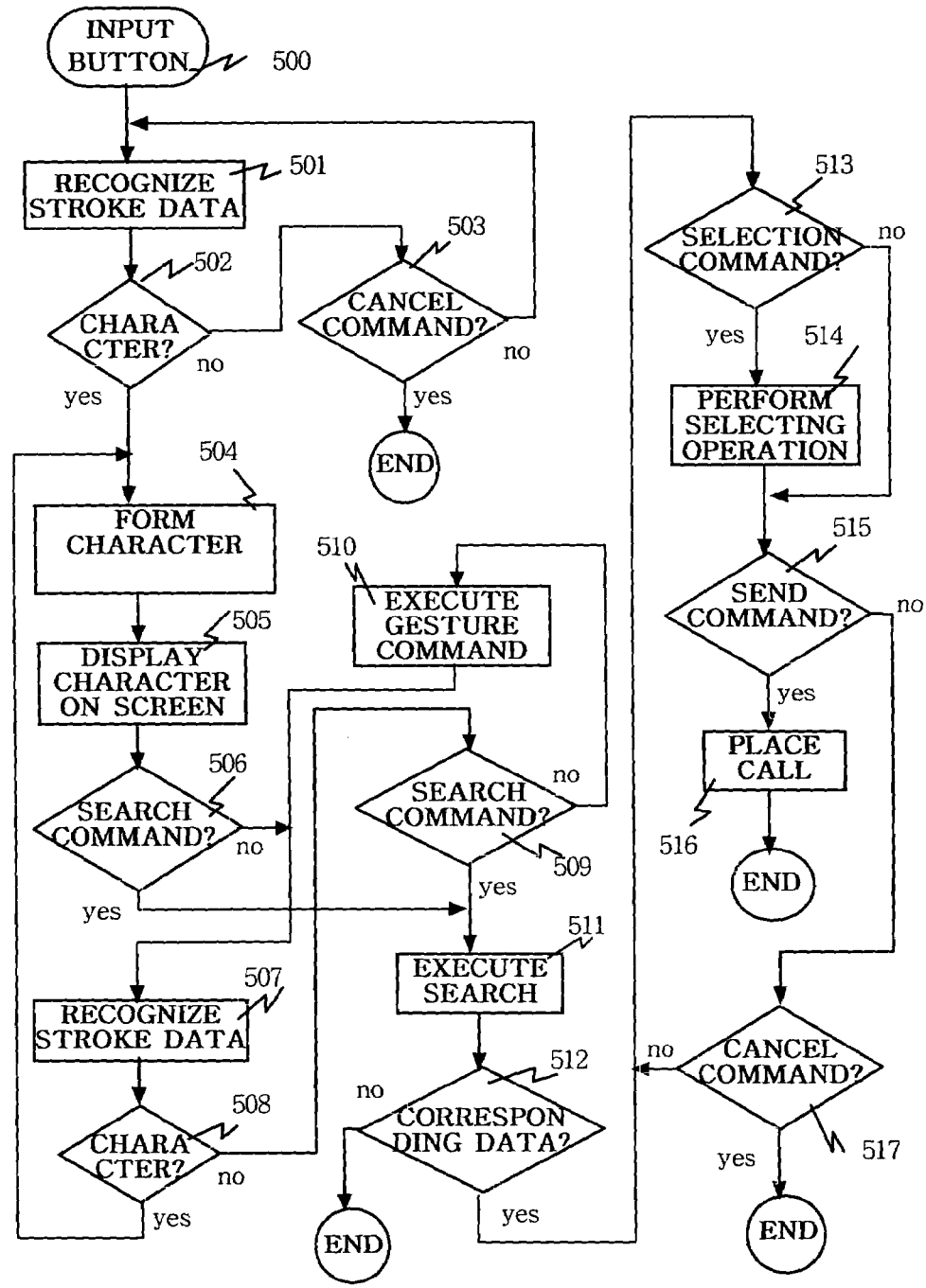

[ FIG26 ]
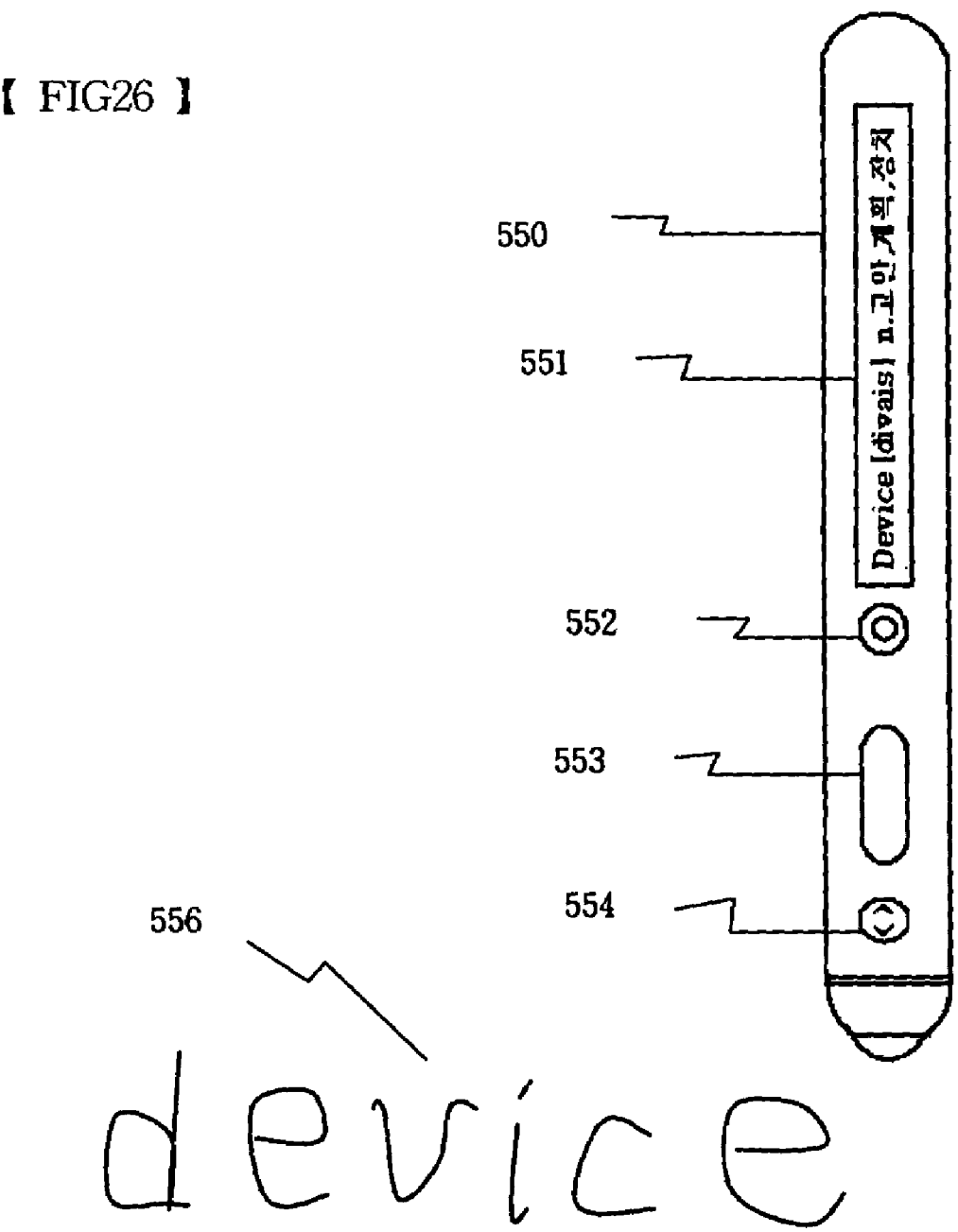

[ FIG27 ]
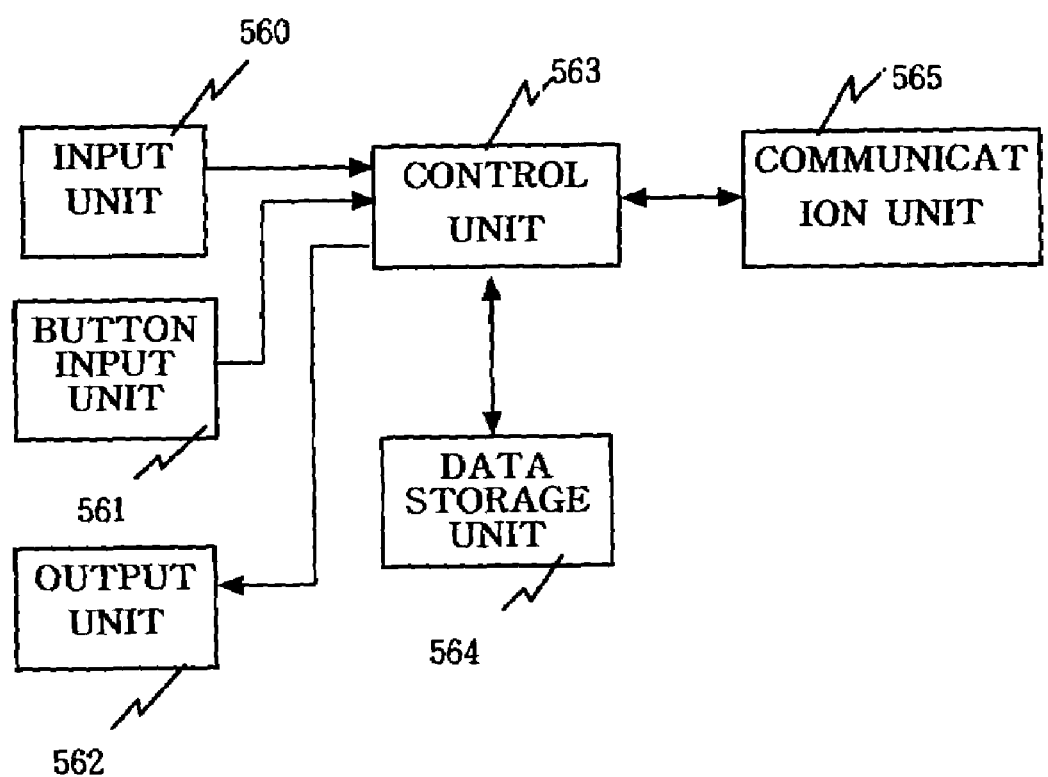

[ FIG28 ]
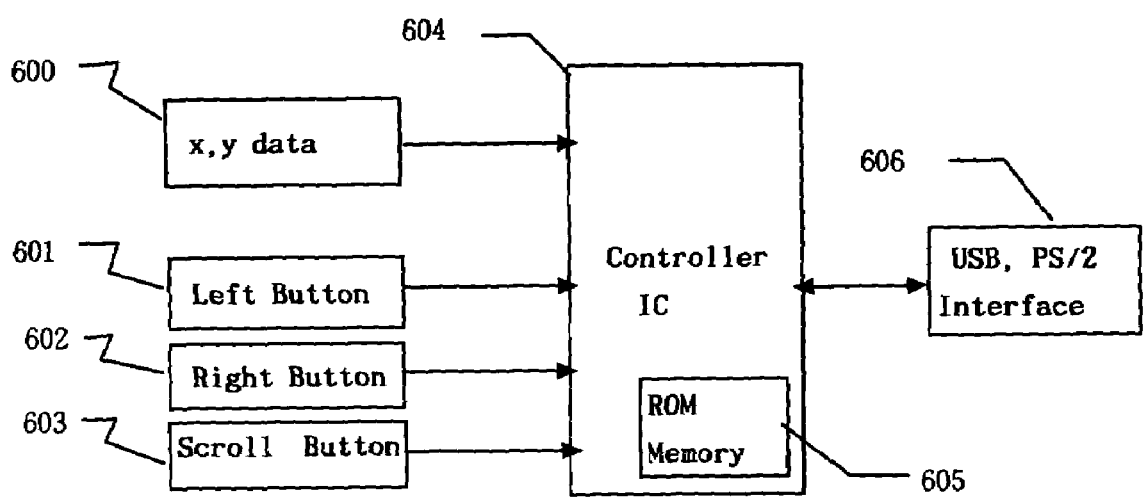

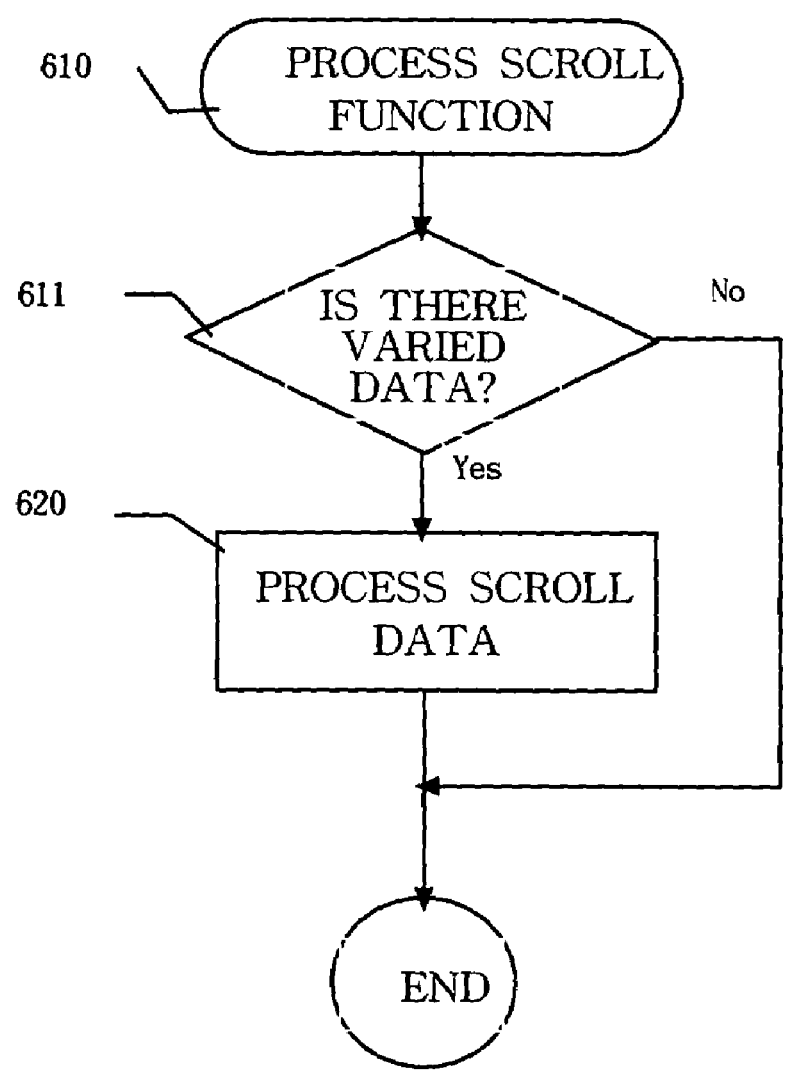
[ FIG29 ]

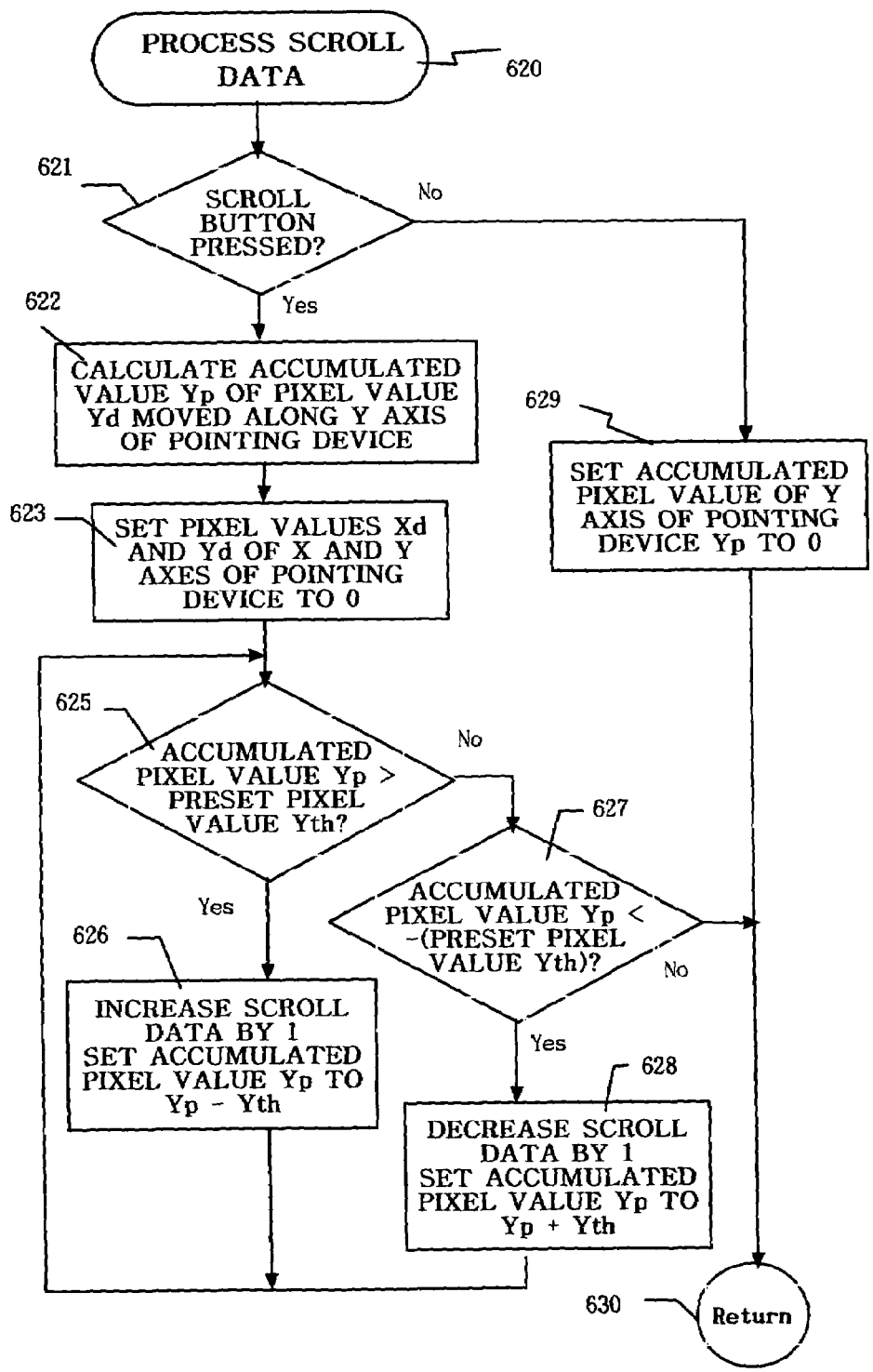
[ FIG30 ]

POINTING DEVICE AND SCANNER, ROBOT, MOBILE COMMUNICATION DEVICE AND ELECTRONIC DICTIONARY USING THE SAME

BACKGROUND OF THE INVENTION

1. Field of the Invention

The present invention relates generally to pointing devices, and more particularly to a pen-type mouse device.

2. Description of the Related Art

A conventional mouse is operated in such a way that a cursor is moved or a click operation is performed by a user moving a mouse on a plane, such as a mouse pad, to rotate a ball of the mouse.

Further, an operation can be carried out using a pen-type mouse instead of a conventional mouse. A pen-type mouse is formed in a pen shape to allow the operation of the mouse to be similar to a handwriting operation of a human being, thus further facilitating the operation of the mouse.

Generally, a pen-type mouse is operated in such a way that a tablet, such as a digitizer, recognizes that the pen-type mouse approaches or comes into contact with the tablet.

Further, the movement of a cursor is not performed by moving the pen-type mouse while bringing the pen-type mouse into contact with the tablet, but performed by moving the pen-type mouse on the tablet in a non-contact manner while spacing apart from the tablet by a certain distance (typically, 1.5 cm). Therefore, it is inconvenient to move the pen-type mouse, that is, move the pen-type mouse while spacing apart from the tablet by a certain distance. A user develops discomfort at his or her wrist even though the user only gently uses the pen-type mouse. Such an inconvenience becomes a weak point in a recent trend toward the rapid increase of the utilization of a computer and a mouse.

Further, in order to implement a pen-type mouse using a conventional ball mouse, the size of a ball must be decreased. However, as the size of the ball is decreased, the sensitivity of the mouse movement is greatly decreased. Therefore, it is difficult to maintain the sensitivity of the conventional mouse from a mechanical perspective. That is, most pointing devices using a ball employ a method of recognizing the rotation of a ball through a pinion gear. However, as the size of a ball is decreased, driving force capable of rotating the pinion gear is decreased. Therefore, since the pointing sensitivity and precision of the mouse is decreased, such a ball mouse is not suitable for the pen-type mouse.

Further, a pen-type mouse produced in a conventional optical image manner is problematic in that, as the slope of the mouse varies, a distance between an image sensor and a plane varies to deviate a focus, thereby preventing the operation of the mouse from being recognized.

Further, as a method of implementing a pointing device using a conventional pen-type optical device, there is a method of reducing the size of a lens to increase a depth (a focal distance to a location where an image of an object is formed is increased by reducing the size of an iris of a lens in a camera) and maintaining a certain distance from an image using a ball-point pen or tip point sharply projected from the front of the device, thus solving a problem of image distortion of an object due to the slope of the pointing device according to a pointing operation in some degree. However, this method enables a pointing function on only a plane on which a uniform pattern is formed (a paper or mouse pad on which a pattern is printed).

SUMMARY OF THE INVENTION

Accordingly, the present invention has been made keeping in mind the above problems occurring in the prior art, and an object of the present invention is to provide a pointing device (mouse, etc.) which does not require a tablet, such as a digitizer.

Another object of the present invention is to provide a mouse, which is mechanically simplified.

A further object of the present invention is to provide a mouse, in which a moving ball comes into contact with only bearing balls to greatly facilitate the rotation of the ball, thus remarkably improving the sensitivity of ball movement.

Still another object of the present invention is to provide a mouse, which can be used while being freely moved like a writing tool.

Still another object of the present invention is to provide a mouse, which can precisely perform a mouse operation even while declining in an arbitrary direction.

Still another object of the present invention is to provide a mouse, which can perform a mouse operation even on a glass plane or a uniform-colored smooth material on which a conventional optical mouse was not operated.

Still another object of the present invention is to provide an optical image-type mouse for low power, in which a light guide improves the efficiency of light irradiation by guiding light to a desired region of a surface of an object while minimizing light loss using optical fiber, and minimizes power consumption due to lighting by eliminating light loss occurring on unnecessary regions of the surface thereof.

Still another object of the present invention is to provide a pen-type mouse, which has enough pointing sensitivity to enable the pen-type mouse to be used as a mouse even though the size of a ball, a medium for detecting a pointing operation by moving a device in the pen-type pointing device, is small.

Still another object of the present invention is to provide a pointing device, which employs a small ball to have an encoder function and a handwriting function in a pen-type scanning device.

Still another object of the present invention is to provide a pointing device, which has a simplified construction and has a low cost.

Still another object of the present invention is to provide a mobile phone, in which a small pen-type pointing device is mounted thereon to perform a handwriting recognition function according to a pointing function, thus providing a key word input function and a search function at the time of searching a phonebook, and also providing a handwriting memo function and a drawing function.

Still another object of the present invention is provide an electronic dictionary, which is provided with a handwritten character recognition function, an electronic dictionary function and a screen display unit to display dictionary contents corresponding to a word consisting of recognized characters on a screen of the display unit.

Still another object of the present invention is provide a pointing device, which provides a page up/down scroll function using a simple scroll button even in various types of pen-type pointing devices, specifically, provides a scroll function by moving the pen-type pointing device upward and downward, while the scroll button is pressed, to perform a pointing operation.

In order to accomplish the above object, the present invention provides a pointing device, which employs a small ball and detects the movement of the ball using an optical image sensor so as to solve typical problems (pointing sensitivity and the size of the exterior of a mechanical tool) occurring when a pen-type pointing device is implemented.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view showing images received by an optical image sensor applied to a mouse according an embodiment of the present invention;

FIG. 2 is a schematic diagram showing the construction of a mouse according to an embodiment of the present invention;

FIGS. 3A and 3B are views showing the arrangement of a ball of a front end of the mouse and bearing balls for facilitating the rotation of the ball according to an embodiment of the present invention;

FIG. 5 is a schematic diagram showing the construction of a mouse with a button switch taken into consideration according to an embodiment of the present invention;

FIG. 6 is a schematic diagram showing the construction of a mouse according to another embodiment of the present invention, wherein an outward shape of an optical image sensor is a SMD type;

FIG. 7 is a reference view showing an image processing-possible region of a surface of a ball;

FIG. 8 is a schematic diagram showing the structure of optical fiber and a light path;

FIG. 9 is a schematic diagram showing a light path through a light guide in a conventional optical mouse;

FIG. 10 is a schematic diagram showing a light path when the light guide is replaced by optical fiber in the conventional optical mouse;

FIG. 11 is a schematic diagram showing a light path when the light guide is replaced by the optical fiber and the size of an LED is reduced in the conventional optical mouse;

FIG. 12 is a configuration diagram of an optical image detecting apparatus using a method of overlapping images on the different regions of the surface of a ball;

FIG. 13 is a development of a soccer ball of a regular icosahedron;

FIGS. 14A and 14B are a view showing a geodesic sphere based on regular triangles and a development thereof, respectively;

FIG. 15 is a view showing an outward shape of a pen-type scanner device, in which a ball-point pen-type optical mouse device is mounted as an encoder, according to an application embodiment of the present invention;

FIG. 16 is a system configuration diagram of the pen-type scanner device, in which a ball-point pen-type optical mouse device is mounted as an encoder, according to the application embodiment of the present invention;

FIG. 17 is a view showing an outward shape of a pointing device equipped with a laser pointing device;

FIG. 18 is a system block diagram of a mobile communication device equipped with a pointing device;

FIG. 19 is a view showing a method of inputting Hangul characters in a handwriting manner;

FIG. 20 is a view showing an example of a method of inputting English characters in a handwriting manner;

FIG. 21 is a view showing a method of inputting gesture commands, such as mode conversion and special characters, in a handwriting manner;

FIG. 22 is a view showing a method of inputting English characters and numeric characters in a handwriting manner;

FIG. 23 is a view showing a mobile communication device equipped with a pointing device according to an embodiment of the present invention;

FIG. 24 is a view showing a mobile communication device equipped with a pointing device according to another embodiment of the present invention;

FIG. 25 is a flowchart showing input, search and calling operations in the mobile communication device equipped with a pointing device;

FIG. 26 is a view showing an example in which characters are input and recognized in a handwriting manner using the pointing device according to the embodiment of the present invention, and the recognized results and contents of an electronic dictionary corresponding to the results are displayed on a screen;

FIG. 27 is a system block diagram of an electronic dictionary according to an embodiment of the present invention;

FIG. 28 is a view showing a controller chip provided within the pointing device and signal data related to the controller chip;

FIG. 29 is a flowchart showing scroll processing; and

FIG. 30 is a flowchart showing scroll data processing; and

DESCRIPTION OF THE PREFERRED EMBODIMENTS

Figure 4A:
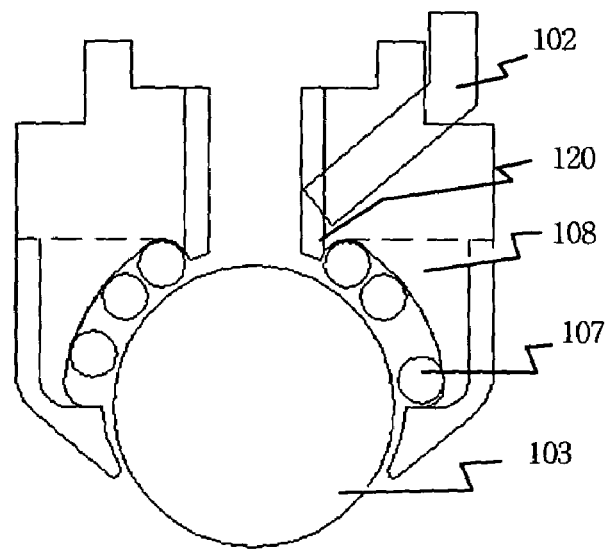
FIGS. 4A to 4H are views showing the arrangement of a ball of a front end of the mouse and bearing balls for facilitating the rotation of the ball according to another embodiment of the present invention.

Reference now should be made to the drawings, in which the same reference numerals are used throughout the different drawings to designate the same or similar components.

An optical image sensor is generally used in optical mice. Currently, in most optical mice, an optical image sensor is used in combination with a lens capable of having a resolution of 400 dpi (dot/inch), and uses 16×16 pixel data per frame as an image required for calculation in an optical part to detect the movement of a ball.

FIG. 1 illustrates an example of 64 level-gray images as image data input to an optical image sensor (refer to data sheets of Agilent optical mouse Sensors ANDS-2051 and HDNS-2000). The optical image sensor is comprised of an Image Acquisition System (IAS) for acquiring images, a Digital Signal Processor (DSP) for executing signal processing of the acquired images in a digital manner, a function of selecting a PS/2 mode of the mouse, and an output converter for converting the processed images into data corresponding to X and Y-axis components, and outputting the converted data. The DSP within the optical image sensor calculates a direction and a distance by comparing and analyzing previous and current images, consecutively sampled and input, through the calculation of a correlation between the images, and outputs the direction and distance as horizontal and vertical (X and Y-axis components) displacement data. If two images of FIG. 1 are compared and analyzed, it can be seen that a previous image moves to the left by three pixels and downward by one pixel. Such a calculation of the movement direction and distance of the image takes a lot of time, but can be rapidly performed using the DSP.

Therefore, the image size capable of representing 16 pixels in horizontal and vertical directions, respectively, at a resolution of 400 dpi is sufficient for the size of an image on a plane, such as a mouse pad for actually acquiring images.

That is, it is satisfied that 16 pixels÷(400 piexels/25.4 mm)=1.016 mm.

Even though the image size is theoretically 1.0 mm, a region of approximately 1.5 mm×1.5 mm is sufficient to stably input data if slight shaking is taken into consideration in a typical mouse. Further, in order to detect the movement of a ball on the basis of the surface of the ball with a smaller region, an area corresponding to 16×16 pixels necessary for image processing executed in the optical mouse is 0.5 mm (½ of 1.0 mm)×0.5 mm, if a lens for acquiring images is designed to correspond to 800 dpi. In this way, if the resolution (magnification) of the lens is increased, the area of the ball surface corresponding to image data processed by the optical image sensor is decreased. Therefore, since a small ball can be used, it is possible to implement a mouse as a pen-type mouse. The movement of the mouse can be detected using an image on a surface corresponding to 1 mm×1 mm (in the case where a lens corresponding to a resolution of 400 dpi is used) on a ball with a diameter more than 3 mm.

In the present invention, in order to input an image with a resolution of 400 dpi to an optical image sensor, the lens is designed so that a distance between the optical image sensor and the lens is approximately 15 mm, a distance between the lens and the surface of the ball is 15 mm, and the depth of a focus of the lens is approximately 1 mm. Therefore, data on the movement of the mouse can be detected by reading an image on the surface of the ball through the optical image sensor in the case where a distance between the lens and the surface of the ball is 14 to 16 mm.

The lighting of the optical mouse is different from that of a typical optical sensor. The lighting has a lighting angle between 16 and 20 degrees (generally, around 20 degrees) to enable a rough state (relative roughness) of a surface, on which the movement is detected, to be discriminated, thus detecting the movement of the ball even on white paper on which nothing is written. In the present invention, a ball with slight relative roughness (having slight prominences and depressions on its surface) is adopted and the surface of the moving ball is detected, thus performing a mouse function.

Further, since a light guide using optical fiber guides light to a position close to the surface of an object, the radiation efficiency is very high. Further, since the optical fiber is freely bent, a space occupied by the mouse can be minimized. Actually, it can be seen that higher mouse sensitivity is obtained when light is irradiated onto an object using optical fiber instead of a light guide generally used in the conventional optical image-type mouse. That is, the conventional light guide results in light loss because light is irradiated onto unnecessary regions of the surface of the object while reaching a desired region of the surface thereof, due to diffusion of the light emitted from a Light Emitting Diode (LED). On the contrary, since the optical fiber sufficiently propagates light even though it is bent, a high % of the light can be concentrated onto the surface of the object if light is irradiated close to the surface of the object. Therefore, the optical image sensor can obtain a good quality image, thereby improving the pointing sensitivity of a mouse.

Further, it is preferable to print a specific pattern on the surface of the ball so as to sufficiently detect the movement of the ball by the optical image sensor. The pattern on the ball surface is formed so that 8-pixel unit (½ of the 16-pixel unit based on 400 dpi) images are distinguished from other images, thus enabling at least one dot, line or pattern to exist on each image within 8 pixels. Such a structure can be represented by a geodesic sphere based on regular triangles (refer to FIGS. 14A and 14B). Therefore, it is most preferable to allow each of the regular triangles to have a pattern, which is distinguished from neighboring patterns.

Hereinafter, an embodiment of the present invention will be described in detail with reference to the attached drawings.

First, reference numerals used in the drawings are described. FIGS. 2 to 6 are schematic diagrams showing the construction of a mouse according to an embodiment of the present invention, especially showing internal and partial external construction of the mouse.

In the drawings, reference numeral 101 represents a light source comprised of an LED and the like to emit light. Reference numeral 102 represents a light guide comprised of optical fiber and the like to guide light emitted from the LED 101 in a required direction, that is, to a ball 103. If light from the LED 101 can be precisely irradiated onto the ball 103, the light guide 102 can be omitted. That is, if a chip LED is used as the light source to irradiate light close to the surface of the ball 103, the light guide 103 can be omitted.

Reference numeral 103 represents the ball, which is similar to that used in a typical mouse. Preferably, slight prominences and depressions are formed or specific patterns are printed on the spherical surface thereof. Reference numeral 104 represents a lens for focusing light reflected from the ball 103 and magnifying an image to have a suitable size. However, the lens 104 can be omitted in the case where a distance between the ball 103 and an optical image sensor 106 is small and then the reflected image can be directly input to the optical image sensor 106 without magnification.

Reference numeral 105 represents a reflecting mirror for converting the direction of light, irradiated onto the ball 103 through the light guide 102 from the LED 101, reflected from the ball 103 and then focused by the lens 104, and irradiating the converted light onto the optical image sensor 106. The reflecting mirror 105 can be omitted in the case where light is directly incident onto the optical image sensor 106, as shown in FIG. 6. Reference numeral 106 represents the optical image sensor, and in this case, an optical image sensor similar to that used in a typical optical mouse can be used.

Figure 4B:
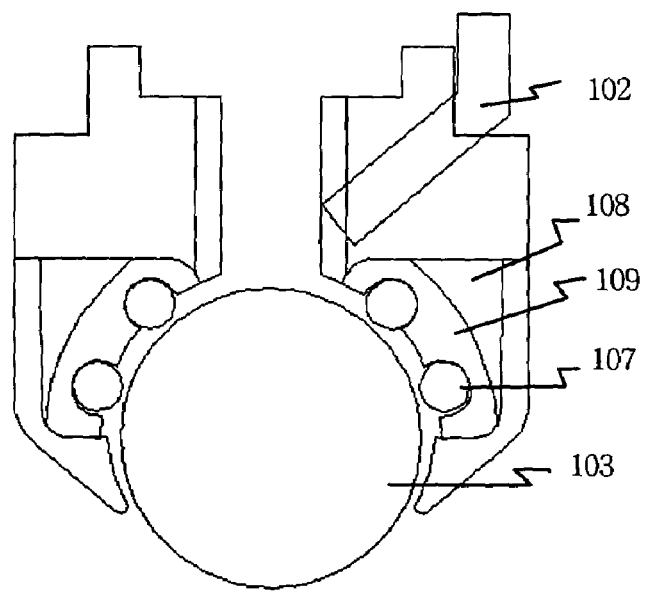
Figure 4C:
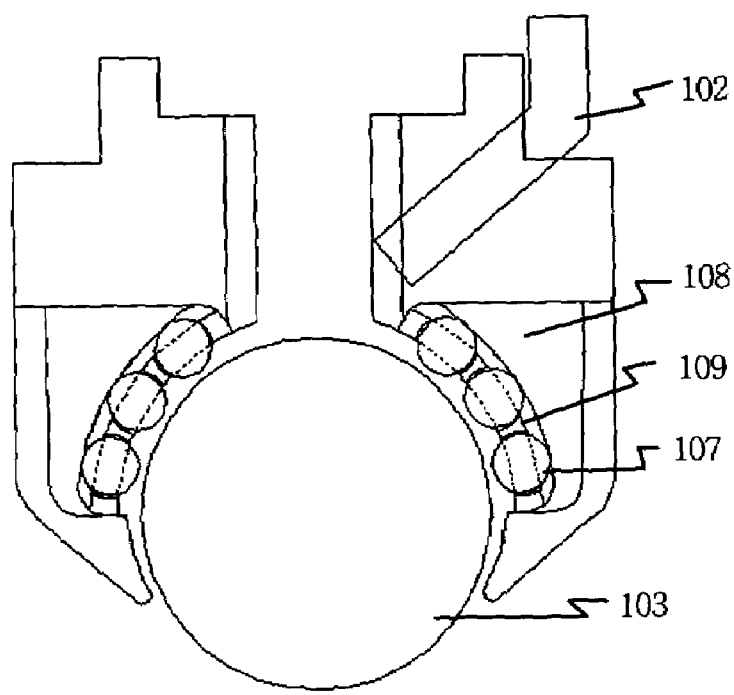

Reference numeral 107 and 107a represent bearing balls for facilitating the rotation of the ball 103 while coming into contact with the ball 103. Especially, the bearing balls 107a are disposed at a lower portion of the mouse to prevent the ball 103 from being removed from the mouse. These bearing balls 107 and 107a can be omitted in the case where the ball 103 can be smoothly rotated without being removed from the device. Reference numeral 108 represents bearing ball supports that enclose bearing balls 107 and 107a and are made of engineering plastic, etc., to smoothly roll the bearing balls 107 and 107a according to the characteristics of the material thereof. In FIGS. 3A and 3B, an embodiment of the arrangement of the ball 103 and the bearing balls 107 and 107a is shown. However, this arrangement is not limited to the embodiment, but it suffices if the device is designed so that the bearing balls 107 and 107a are uniformly applied with the operating pressure of the ball 103 to stably and smoothly roll. In FIGS. 4A to 4H, another embodiment of the arrangement of the ball 103 and the bearing balls 107 and 107a is shown. FIG. 14A shows a construction designed so that a space for enabling the bearing balls to move is formed between the ball and the bearing ball supports and the bearing balls can move when the plurality of bearing balls roll while coming into contact with the ball within the space. In the constructions of FIGS. 4B and 4C, reference numeral 109 represents a bearing ball retainer having a shape similar to a retainer of bearing, in which bearing balls roll smoothly in the retainer 109. The retainer 109 of FIG. 4B is constructed so that rail-shaped grooves are formed in an inner surface thereof to accommodate the bearing balls 107. The retainer 109 of FIG. 4C is constructed so that grooves are formed in an inner surface thereof to accommodate the bearing balls 107. The retainer 109 can be constructed rotatably around a vertical axis of the device.

Figure 4D:
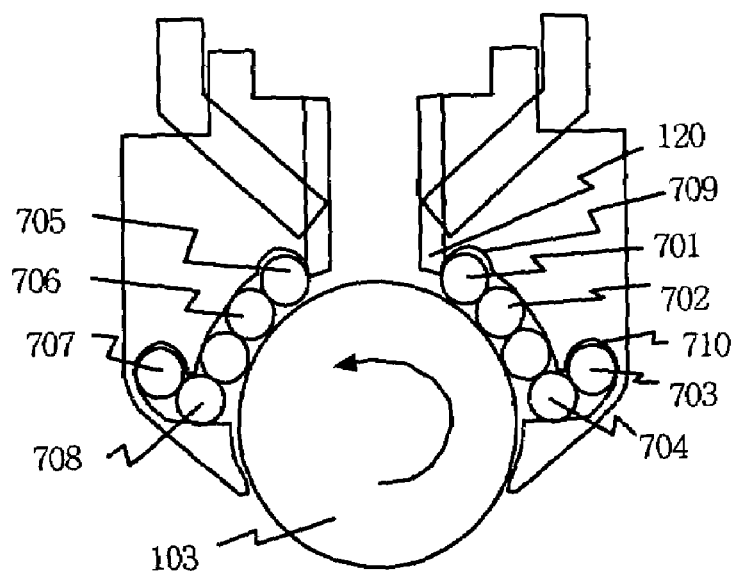
Figure 4E:
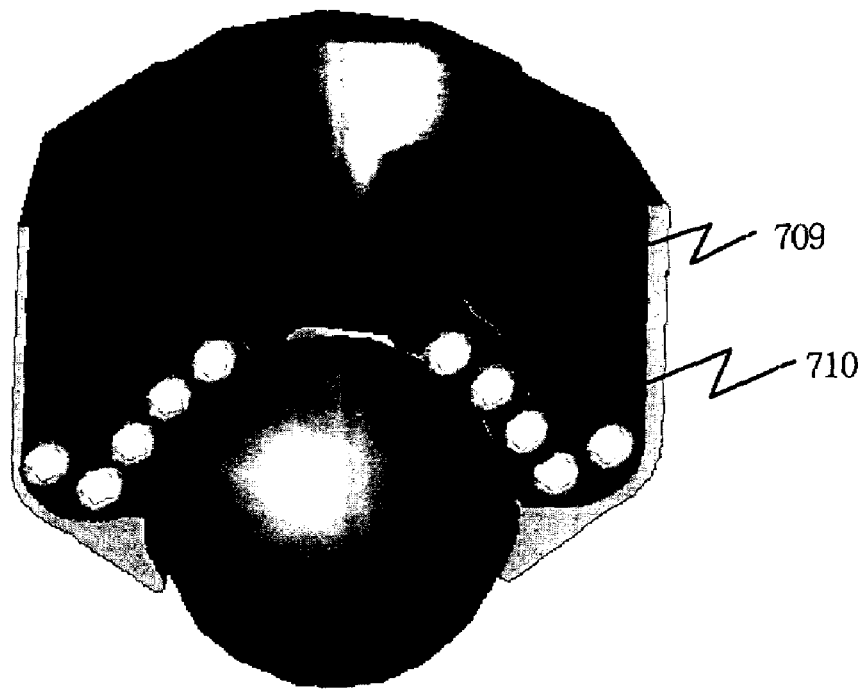

In the construction of FIG. 4D, a ring-shaped edge space is formed in a lower portion of the bearing ball support to allow a bearing ball, not coming into contact with the ball 103, to be pushed and moved along the edge space. FIG. 4E illustrates a central section of a three-dimensional view of FIG. 4D. In an upper portion of the bearing ball support, a ring-shaped projection 120 is formed to prevent a bearing ball from moving to a position on which light is irradiated so as to perform an optical image sensing operation. In a region of the bearing ball support in which bearing balls 701 and 705 come into contact with the projection 120, a ring-shaped groove 709 is formed to allow the bearing balls 701 and 705 to be pushed and moved along the ring-shaped groove 709. Such upper and lower ring-shaped grooves are used to allow the ball 103 to be pushed by the bearing balls and easily moved when the ball 103 rotates. When a bearing ball 704 positioned in the lower ring-shaped groove 710 moves upward while the ball 103 rotates counterclockwise, and, therefore, a bearing ball 703 moves downward. When the bearing ball 701 moves upward by the rotation of the ball 103, and blocked by the ring-shaped projection 120, the bearing ball 701 moves to the left in the drawings through the ring-shaped groove (refer to FIGS. 4D and 4F). Meanwhile, the bearing balls 705 and 706 move downward according to the rotating direction of the ball 103 in rolling contact with the ball 103.

Figure 4F:
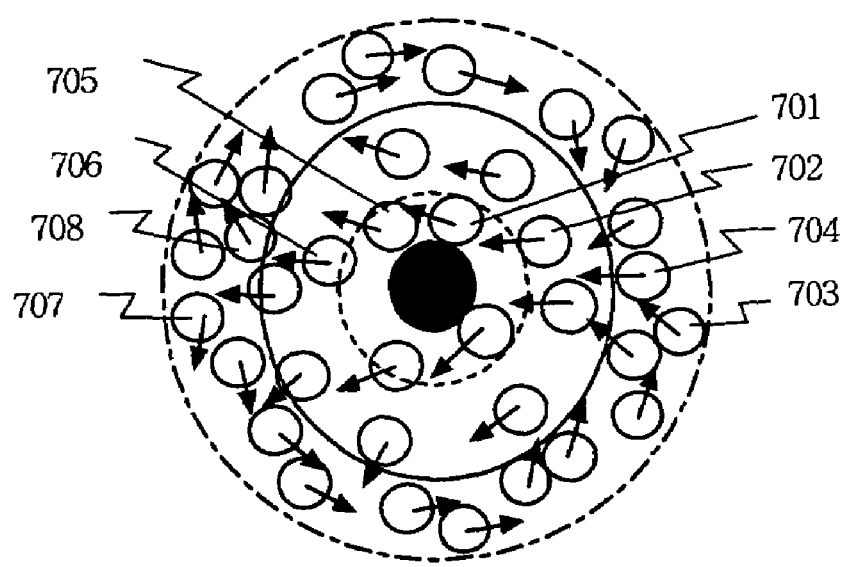

FIG. 4F is a top view showing the movement of bearing balls. Bearing balls moving in rolling contact with the ball 103 when the ball 103 rotates counterclockwise, move from the right to the left. The bearing balls 707 and 708, positioned in the lower left portion, move to the right within the ring-shaped groove and surrounding space thereof by bearing balls 705 and 706, continuously pushed and moved downward. When moving by a certain distance, the bearing ball 707 escapes from the ring-shaped groove and moves again to the left in rolling contact with the ball 103. That is, it can be seen that such a bearing ball moves along an endless track together with the rotation of the ball 103.

Figure 4G:
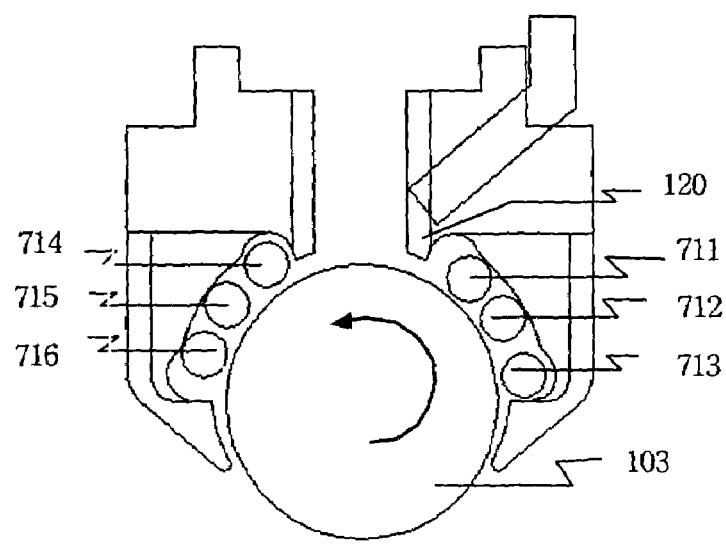
Figure 4H:
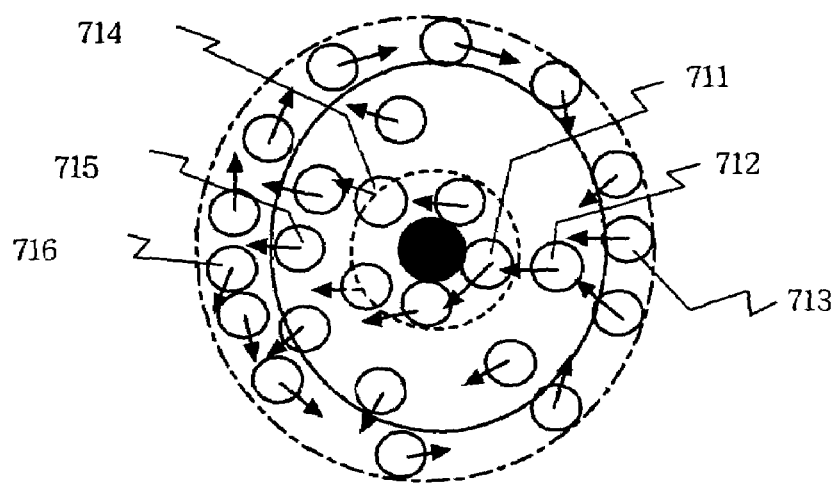

FIG. 4G, ring-shaped grooves having slight margins are formed in upper and lower portions of the bearing ball support, thus obtaining the effect of the smooth rolling of the bearing balls 711–716, which are similar to the bearing balls 701–708 described in FIG. 4D. FIG. 4H is a top view showing the movement of the bearing balls of FIG. 4G. When the ball 103 moves counterclockwise, the movement of the bearing balls is the same as the above description. As the ball 103 rotates counterclockwise, the bearing balls 711, 712 and 713 existing in the right side move upward and reach the right bearing ball projection 120. At this time, the bearing balls 711, 712 and 713 move to the left through the upper ring-shaped groove, and then move downward. The bearing balls 711, 712 and 713, positioned in the lower left portion, are planned to move to the right through the lower ring-shaped edge (ring) space with a margin by bearing balls continuously pushed and moved thereto and move again to the left in a rolling contact with the ball 103 at a suitable position.

Reference numeral 110 and 111 represent an internal device and an external device of the pen-type mouse, respectively. Reference numeral 112 represents springs that absorb pressure and impacts applied to the mouse through the ball 103, allow the user to feel writing pressure, and turn on a button switch 113 if the pressure is equal to or greater than a certain value, as will be described later. Reference numerals 113 and 114 represent button switches that function as left/right buttons of a typical mouse. That is, the button switches are used to perform clicking or dragging.

Hereinafter, the operation of detecting the movement of the ball 103 when light is irradiated is described. Light irradiated from the LED 101 is incident on the light guide 102. The light guide 102 guides light from the LED 101 to be irradiated onto the surface of the ball 103. The light, irradiated onto the surface of the ball 103 and reflected therefrom, is incident onto the optical image sensor 106 through the lens 104 and the reflecting mirror 105, and is image-processed. Therefore, the movement of the ball 103, thus, the movement of the mouse, is detected. Since the optical image sensor 106 is generally equipped with a communicating function, such as PS2 communication, it transmits data representing the movement of the ball 103 to an external PC, etc., thereby enabling a mouse function to be performed. In the above operation, the ball 103 has certain relative roughness on its surface, that is, roughness. The optical image sensor 106 can detect the movement of the ball 103 on the basis of slight prominences and depressions of the ball 103.

FIG. 5 illustrates an example in which the mouse is separated into the internal device 110 and the external device 111, and the button switches 113 and 114 are arranged. If the ball 103 coming into contact with a plane, such as a mouse pad, is pressed, the entire internal device 110 is retracted inward, and then the button switch 113 is pressed. Such a button switch 113 can be utilized as the left button of a mouse. The button switch 114 exposed to the outside can be utilized as the right button of a mouse. If the ball 103 is not pressed, the internal device 110 is pushed downward by the springs 112, and then the button switch 113 is not operated. As described above, a certain interval remains between the internal device 110 and the button switch 113. Therefore, in the case where the button switch 113 is utilized as the left button of the mouse, the entire internal device 110 is retracted upward against the elastic force of the springs 112 if the ball 103 is pressed across a certain distance or farther, thereby pressing the button switch 113 to be operated. Further, it is possible to move only the ball 103 to operate the button switch 113 if pressure is applied to the ball 103.

FIG. 6 is a schematic diagram showing the construction of the pen-type mouse when the optical image sensor 106 is manufactured in a Surface Mounting Device (SMD) type. Differently from FIG. 5, since the reflecting mirror is not necessary and the size of the optical image sensor is greatly decreased, the entire mouse can be miniaturized. Therefore, the mouse can be utilized as a device having an encoder function, which can be universally used. Reference numeral 115 of FIGS. 5 and 6 represents a scroll button. A scroll function can be performed through up/down pointing operations while the scroll button 115 is pressed. This function is simply implemented by revising a Read Only Memory (ROM) program within a controller chip mounted in the device. That is, if a movement distance is equal to or greater than a preset distance when the pointing device is moved upward or downward while the scroll button is pressed, that is, if a pixel value corresponding to the movement distance is equal to or greater than a preset value, it is recognized that up/down scroll data is generated, thus the scroll function is implemented. This method is more convenient than a method of implementing the scroll function by rotating a wheel in a pen-type pointing device or pen mouse.

A scroll function in a typical wheel mouse is implemented by rotating a wheel to allow each page on a screen to be scrolled upward and downward. Internally, when the wheel rotates, an electronic pulse is output, so that a page scroll on the screen is executed at every pulse. When the wheel rotates one turn, 22 pulses are output. The diameter of the wheel is generally 24.5 mm, and the circumference thereof is 76.96 mm. Therefore, a length corresponding to one pulse is 3.49 mm, which corresponds to 55 pixels at the resolution of 400 dpi. Therefore, if the wheel moves by 3.49 mm, one scroll pulse is output.

The scroll function of the present invention is described in detail with reference to FIGS. 5, 6, 28, 29 and 30.

FIG. 28 is a configuration diagram of a controller and related signals within the pointing device according to the present invention. Reference numeral 600 represents data that indicates coordinate displacements of the device, received from a sensor, such as an optical sensor, and is obtained by detecting the movement of the pointing device in X and Y-axes when the pointing device moves and digitizing the detected movement. Reference numerals 601 and 602 represent data related to left and right buttons. In this case, when the left and right buttons of the pointing device are pressed, respectively, signals are input from the left and right buttons. Reference numeral 603 represents data related to the scroll button. A state in which the scroll button is pressed is input as data.

Reference numeral 604 represents a controller chip, in which programs for controlling the system and executing data input/output are provided. Reference numeral 605 represents a programmable ROM provided within the controller chip 604. Reference numeral 606 represents an interface for communicating with an external device, such as a PC, in a PS/2 or Universal Serial Bus (USB) manner. The controller 604 receives button state data and coordinate displacement data of the movement of the device, and transmits the data to the PC. Generally, the input data values are stored in registers in the controller chip. At this time, scroll data processing is executed by determining whether the scroll button has been pressed. In a typical 3D pointing device, the controller chip 604 additionally receives Z-axis-related scroll data or data corresponding to a pulse train input signal.

In order to implement the scroll function of the present invention, that is, implement scroll up/down of a page by moving the device upward and downward while the scroll button 115 of FIGS. 5 and 6 is pressed, an internal program of the controller chip 604 must be revised. Reference to FIGS. 27 and 28 as examples, a data processing function of the controller 604 having a revised program is described.

A control program of a conventional mouse device is revised to call a routine of FIG. 29 whenever input data is processed. FIG. 29 is a flowchart showing a scroll processing routine, in which scroll data is processed by determining whether input data, such as button states and coordinate displacements, is varied.

Step 610 leads the scroll processing routine. If step 610 is called by the control program, step 611 is immediately executed. It is determined whether there is varied data at step S611, and a scroll data processing routine of step 620 is executed if there is varied data; otherwise, the control program returns to a main routine that has called the step 610.

Step 620 of FIG. 30 leads a subroutine for processing the scroll data. It is determined whether the scroll button has been pressed at step 621. If the scroll button has not been pressed, an accumulated pixel value of a Y-axis is initialized to "0" at step 629, and the control program returns to a main routine that has called the routine of step 620. If the scroll button has pressed at step 621, step 622 is executed. Y-axis displacement data Yd, obtained by sensing the movement of the pointing device among X and Y input data of the controller, is accumulated and calculated as a constant Yp at step 622. The accumulated pixel value Yp indicates a pointing pixel value of the pointing device that has moved along the Y-axis while the scroll button is pressed.

After step 622, step 623 is executed. At step 623, X and Y input data are set to 0 so as not to move the cursor of the pointing device while the scroll button is pressed.

After step 623, it is determined whether the accumulated pixel value Yp is greater than a preset pixel value Yth at step 625. On the basis of the determined results, if the Yp is greater than the Yth, step 626 is executed, while if the Yp is not greater than the Yth, step 627 is executed.

In this case, the preset pixel value Yth is a value corresponding to 55 pixels in the above description about the scroll function of the pointing device. If the accumulated pixel value Yp is greater than the preset pixel value Yth, a scroll data value is increased by 1 and the accumulated pixel value Yp is decreased by the preset pixel value Yth at step 626. After step 626, the control program returns to step 625 to repeat the above procedure.

If the accumulated pixel value Yp is less than the preset pixel value Yth, it is determined whether the accumulated pixel value Yp is less than −preset pixel value −Yth at step 627. On the basis of the determined results, if the Yp is less than −Yth, step 628 is executed; otherwise, step 630 is executed to allow the control program to return to a main routine that has called the subroutine of step 620.

At step 628 executed when the accumulated pixel value Yp is less than 31 preset pixel value −Yth, the scroll data value is decreased by 1, and the accumulated pixel value Yp is increased by the preset pixel value Yth. After step 628, the control program returns to step 625 to repeat the above procedure.

The external device, such as a PC, that receives the varied scroll data in the above procedure, performs page scroll on the basis of the scroll data.

The scroll processing routine of step 620 is used to scroll the screen by moving the pointing device upward and downward in the case where the scroll button is pressed.

FIG. 7 is a view showing the unevenness of the surface of the ball 103. Reference numeral 201 represents a distance L1 of 15 mm between the surface of the ball 103 and the optical lens 104. Reference numeral 202 represents a lineal distance L2 of 0.5 mm between a center of a detection region (area of 1 mm$^2$) of the ball surface and one edge thereof. Reference numeral 203 represents an angle θ between a straight line from the center to one edge of the detection region of the ball surface and a tangent line at the center thereof. The angle θ is calculated as $\theta=\sin^{-1}((L2/2)/\text{radius of ball})=\sin^{-1}(L2/\text{diameter of ball})$.

A maximum external distance difference D with respect to the 1 mm$^2$ area of the surface of the ball is calculated as $L2 \times \sin\theta = L2 \times L2/\text{diameter}$. A length of an arc corresponding to the distance L2 is calculated as diameter of ball × 3.141592653 × θ/180°.

The results calculated through respective approximate solutions according to the respective diameters of the ball are shown in Table 1.

TABLE 1

| Diameter of ball | Slope angle θ (Degree) | Length of arc (mm) | External distance difference (mm) |
| --- | --- | --- | --- |
| 10 mm | 2.87 | 0.5002 | 0.025 |
| 9 mm | 3.19 | 0.50026 | 0.027 |
| 8 mm | 3.58 | 0.50033 | 0.031 |
| 7 mm | 4.10 | 0.5004 | 0.036 |
| 6 mm | 4.78 | 0.5006 | 0.042 |
| 5 mm | 5.74 | 0.5008 | 0.05 |
| 4 mm | 7.18 | 0.5013 | 0.063 |
| 3 mm | 9.59 | 0.5023 | 0.083 |
| 2 mm | 14.48 | 0.5054 | 0.125 |
| 1 mm | 30.0 | 0.5236 | 0.25 |

According to the above results, in the case where the diameter of the ball is above 3 mm, the distance D between the edge of the detection region of the ball surface and the tangent line is equal to or less than 0.083 mm which is below $\frac{1}{10}$ of the 1 mm (1 mm is the depth of the lens). Therefore, a relatively good image can be obtained. Consequently, if the diameter of the ball is above 3 mm, sufficient pointing sensitivity can be obtained. Further, if a lens designed to receive an image with the resolution of 400 dpi (corresponding to 1.0 mm$^2$ region of the ball surface in the present invention) is changed to have the resolution of 800 dpi, a required image region of the ball surface is only 0.25 mm$^2$, thus further reducing the size of the ball.

The light guide 102 is used to provide an optical image-type pointing device, which improves the light efficiency by guiding light to a desired region of a surface of an object while minimizing light loss using optical fiber, and which minimizes power consumption due to lighting by eliminating light loss occurring on unnecessary regions of the surface of the object.

Plastic optical fiber used in the present invention is comprised of a core layer made of an acryl resin with a high degree of purity (Polymethyl methacrylate: PMMA) and a thin cladding layer made of a special fluoric polymer (Fluorinated-Poly methyl methacrylate: F-PMMA). Since the reflective index of the cladding is less than that of the core, light incident from one end of the optical fiber causes total reflection in a contact surface of the core and the cladding, and is output to the other end of the optical fiber through the core. The reflective indexes of the core and the cladding are 1.495 and 1.402, respectively. An acceptance angle (numerical aperture), that is, an angle at which the optical fiber can accept light at one end thereof, is 60°. One of the advantages of the plastic optical fiber is that a ratio of a core to a sectional area of the optical fiber is very high. For example, since the diameter of a core of an optical fiber with an external diameter of 1 mm is 0.98 mm, and the thickness of a cladding layer thereof is 0.02 mm, the ratio of the core to the sectional area of the optical fiber is 98%. These results show that the light propagation efficiency of the plastic optical fiber is very high. The plastic optical and fiber can receive light at an acceptance angle (numerical aperture) of 60°, and almost 100% of the section of the optical fiber can be used as a light path.

FIG. 8 illustrates a light path in an optical fiber, and FIG. 9 illustrates a light guide 302 receiving light from a source 301 actually used in a conventional optical mouse. The light from guide 302 is reflected by a reflector 307 provided on a supporting surface 306. FIG. 10 illustrates a shape of the light guide when an optical fiber with a diameter of 1.5 mm is used as the light guide. In this case, sufficient sensitivity can be maintained in an optical mouse function. FIG. 11 illustrates a shape of a light guide when the amount of light incident on the optical fiber is increased using a small LED or a chip-type LED.

When the light guide is designed as shown in FIG. 11, pointing sensitivity similar to that of the conventional optical mouse is obtained even though a current flowing through the LED is reduced to 50%. That is, since an image necessary for the detection of an optical image sensor has a region of 1 mm.sup.2, improved pointing sensitivity can be obtained even though a much smaller current is used if light is concentrated onto the region using an optical fiber.

FIG. 12 illustrates a mouse according to another embodiment of the present invention. In this case, light emitted from an LED 101a placed on the left side of FIG. 12 is guided to a left surface 118a of a ball 103 through a light guide 102a. An image (light) on the left surface 118a is guided to a semitransparent reflecting mirror 117 through a reflecting mirror 105a. The semitransparent reflecting mirror 117 has a left surface coated with a transmissivity of 50%. On the semitransparent reflecting mirror 117, 50% of the image on the left surface 118a, input through the reflecting mirror 105a, is reflected from the left surface of the semitransparent reflecting mirror 117 and then guided to a lens 104. The remaining 50% thereof passes through the semitransparent reflecting mirror 117 as it is. Similarly, an optical structure of a right surface 118b is described below. That is, light emitted from an LED 101b is guided to the right surface 118b of the ball 103 through a light guide 102b. An image on the right surface 118b is guided to the semitransparent reflecting mirror 117 through a reflecting mirror 105b. On a right surface of the semitransparent reflecting mirror 117, 50% of the image passes through the semitransparent reflecting mirror 117 as it is, and the remaining 50% thereof is reflected in the right direction. In this way, 50% of the image on the left surface 118a of the ball 103 and 50% of the image on the right surface 118b thereof are combined through the semitransparent reflecting mirror 117. The combined image is input to an optical image sensor 106 through the lens 104 and is image-processed, thus enabling the detection of the movement of the surface of the ball 103. In order to implement such a device, a precise optical device for overlapping images is required.

In this manner, the use of the overlapped image on the ball surface is possible because an object image is an image on the same spherical surface having a property that all object images move in the same direction. The advantage of this manner is in that, since image processing is executed using images received from two surfaces of a ball, rather than an image received from a single surface of the ball, a more precise movement can be detected.

Meanwhile, if a uniform pattern is printed on the ball 103, the optical image sensor 106 can precisely recognize the movement of the ball 103 using the pattern. Therefore, a pattern, for example, a geodesic sphere based on regular triangles as shown in FIG. 14, can be preferably used.

For example, as one of the methods of forming a sphere using typical polyhedrons, there is a method of forming a sphere using 20 regular hexagons and 12 regular pentagons, like a soccer ball (refer to FIG. 13). Each of the regular hexagons can be divided into six small regular triangles and each of the regular pentagons can be divided into five small regular triangles. The number of regular triangles used at this time is 180. As each regular triangle is subdivided into four small regular triangles, the shape of an object formed by the regular triangles approaches a sphere. Therefore, as each of the 180 regular triangles is divided by a larger multiple of 4, the shape of an object formed by the regular triangles approaches a sphere.

Therefore, when a sphere with a diameter of 1 cm is formed using 720 (180×4) regular triangles (refer to FIG. 14), the area of the sphere is calculated as 3.14×1 cm×1 cm=3.14 cm².

At this time, the area of one regular triangle is approximately 3.14/720=0.00436 cm².

Further, the length of one side of the regular triangle is $\sqrt{(0.00436 \times 4/\sqrt{3})}=0.1$ cm.

If each of 720 regular triangles each having a side with a length of 1 mm is divided into quarters to allow the shape of the object formed by regular triangles to further approach a sphere, the number of regular triangles is 2880, and the length of one side of each regular triangle is 0.5 mm.

Therefore, since a case where the length of one side of a regular triangle is 0.5 mm corresponds to eight pixels at the resolution of 400 dpi, an optical image sensor that executes image processing by the 16-pixel unit detects at least one regular triangle pattern. Therefore, image patterns for detecting the movement of the ball are definitely distinguished. If such a triangular lattice pattern is printed on the surface of the ball, three sides of each triangle become borders for enabling the optical image sensor to sufficiently detect the movement of the ball, thereby an effective pattern shape is obtained. A geodesic pattern is most effectively represented when the surface of a sphere is divided equally. At this time, different patterns can be printed at the positions of the regular triangles instead of regular triangles, or according to respective regular triangles. In addition to the above pattern printing method, it is possible that points are densely printed at random positions on the surface of the ball in a printing manner with the resolution above 400 dpi, and the random points are recognized as image shapes with different patterns.

In addition to the above-described method of printing patterns on a ball surface, another method can be used. That is, if a ball is manufactured in such a way that the ball is made of transparent material, and contains impurities or bubbles having the same effect as the impurities, or components having a crystal state us differing from the material of the ball, there can be obtained an effect that random patterns are formed due to the impurities, etc. when light is irradiated onto the ball, thus detecting the movement of the ball.

Further, patterns can be formed by corroding the surface of the ball through a method, such as etching, to allow light to be reflected from the patterns, thereby enabling the optical image sensor to precisely detect the movement of the ball.

Further, if a luminous material or fluorescent material is added to the material of the ball, the optical image sensor can more precisely detect a part with random patterns formed on the surface of the ball or the remaining part without the patterns when light is irradiated onto the surface of the ball. Further, the pointing device is advantageous in that, since the ball projected from the device emits light, the pointing device may be produced as products externally equipped with various pleasant shapes and designs. Especially, in the case of the luminous material, since the entire part of a ball emits light if the ball made of a slightly transparent material is used, there is no need to concentrically irradiate light to a specific position. Therefore, it is possible to implement a light irradiation device and a light guide according thereto in various manners.

If a material with softness, such as urethane or plastic, rather than a hard metal material, is used as the material of the ball, noise occurring due to friction between the ball and internal bearing balls when the ball moves may be reduced. Further, in the case of internal bearing balls moving in a rolling contact with the ball, if a ceramic material, zirconia or plastic material with a smooth surface is used as the material of the bearing balls, noise occurring when the ball rotates can be reduced.

Hereinafter, an application embodiment of the pointing device of the present invention is described.

A device for detecting the movement of a ball of a mouse in the non-contact optical image manner may be manufactured as a module. The module may be mounted on, for example, a scan device and utilized for a device for matching a scanned image using an encoder function used to detect a scan speed or direction. Further, the module may be utilized for a device capable of handwriting using a pointing function of a mouse.

FIG. 15 is a view showing the external construction of a pen-type scanner device combined with the pointing device. Reference numeral 400 represents an image input unit of the pen-types canner, and 420 represents an encoder having the pointing device of the present invention therein.

A ball disposed in a front portion of the encoder 420 is projected frontward by approximately 0.5 to 1.0 mm compared to an input end of the image input unit 400, and is also projected even downward to freely perform a handwriting operation through a pointing function. In order to detect a scan or handwriting operating state, the pen-type scanner is constructed so that, when the scanner is operated, the ball rotates while being slightly retracted inward. At the time of scanning, pointing data (scan speed and direction) according to the rotation of the ball can be detected and used as encoder data in X and Y directions. When an image is scanned by the image input unit 400, an X component of the encoder data is sampled, thus scan data can be obtained at a constant speed. Data of a sloping image is corrected using a Y component of the encoder data. Further, since the ball is disposed in a lower portion of the pen-type scanner, a mouse operation or handwriting operation can be recognized if only a pointing function using the ball is used by utilizing the scanner while inclining it.

Hereinafter, a detailed embodiment of the scanner according to the present invention is described with reference to the accompanied drawings.

FIG. 16 is a system configuration diagram of the pen-type scanner, which includes an image scan unit 400, a scan operation detecting unit 420, and a system control unit 430. The operation of the image scan unit 400 is described. An LED 401 irradiates light onto a plane 403 through a light guide 402. The plane 403 is a place on which an image to be scanned exists. The irradiated light is reflected and dispersed from the image on the plane 403, and then incident onto a Charge Coupled Device (CCD) sensor 405 through a lens 404. Light, incident onto the CCD sensor 405 and reflecting the input image, is converted into an electrical signal. The electrical signal is amplified to an analog image signal with a suitable voltage level by an amplification circuit unit 406, and then applied to an Analog/Digital (A/D) converter 407. The A/D converter 407 converts the input analog image signal into an 8-bit digital code. The digital data converted by and output from the A/D converter 407 is stored in a memory 408 under the control of a Micro Controller Unit (MCU) 409.

Meanwhile, the operation of the scan operation detecting unit 420 used as an encoder is described. An LED 411 irradiates light onto a ball 413 through a light guide 412. The ball 413 rotates according to a scan speed on the plane 403. The light, irradiated onto the surface of the ball 313 and reflected therefrom, is incident onto an optical image sensor 410 through a lens 414. The optical image sensor 410 detects a scan direction and speed from the input image using a Digital Signal Processing (DSP) function provided in the sensor, and outputs the scan direction and speed as X-axis (equal to a scan direction) encoder data and Y-axis (vertical to the scan direction) encoder data, respectively. Of the encoder data, the X-axis encoder data corresponding to the scan direction is directly concerned in the sampling performed by the A/D converter 407, and is sampled only when the scan operation is detected. The Y-axis encoder data is used as reference data at the time of matching the slope of image data stored in the memory 408. The Y (vertical) data is generally utilized as very important data required to correct the slope or distortion of a scanned image. The MCU 409 is a Reduced Instruction Set Computer (RISC) chip having multiple functions, such as entire system control, image processing and character recognition processing. Reference numeral 431 represents a display and communication control module controlled by the MCU 409 to display a scanned image or a recognized character and communicate with external devices.

Another application embodiment of the pointing device of the present invention is described.

Since the structure of a ball and bearing balls according to the present invention is very similar to that of a ball caster, the pointing device can be used as the ball caster or a ball transfer. In this case, a simple ball caster function is performed, and, additionally, a movement distance by which the ball rotates and a movement direction in which the ball rotates can be measured. Therefore, the pointing device can replace the ball caster mounted on a robot, and therefore the robot equipped with the pointing device can provide a navigation function for measuring the movement direction and distance of the robot by measuring the movement of the ball rotating according to the movement of the robot. In a method of measuring relative movement distance and direction between an arbitrary start point and a current position, X and Y-axis distances of a relative movement distance of the robot are obtained, respectively, by setting the X and Y coordinates of the start point to "0", and respectively accumulating X and Y-axis components to a current position, which are received from the pointing device.

A further application embodiment of the pointing device of the present invention is described.

The pointing device is equipped with a laser pointing device at one end thereof, as shown in FIG. 17, so that it can be effectively used as a pointing device for presentations. Reference numeral 440 of FIG. 17 represents the pointing device of the present invention, and reference numeral 441 represents the laser pointing device.

Hereinafter, still another application embodiment of the pointing device of the present invention is described.

The pointing device is miniaturized and mounted on a mobile communication device, such as a mobile phone or a Personal Digital Assistant (PDA), to be capable of handwriting recognition, thus providing a search function for a phonebook or the like, a memo function, and a drawing function.

FIG. 18 illustrates an example of a system block diagram of a mobile phone equipped with the pointing device according to the present invention. Reference numeral 450 represents an input unit implemented as the pointing device of the present invention in the mobile phone and grasped by a user to write a character. The input unit recognizes a written character as consecutive points, and transmits the recognized results to a control unit 451. Reference numeral 451 represents the control unit including a Central Processing Unit (CPU) of the mobile phone. The control unit 40 receives a signal related to the character input from the input unit 450 and recognizes the character with reference to a data storage unit 452. Reference numeral 452 represents the data storage unit for storing stroke data according to character input methods, phonebook data, and other data. Reference numeral 453 represents a button input unit for various function buttons arranged on the surface of the mobile phone. A state in which a corresponding button is pressed is transmitted to the control unit 451 as information. Reference numeral 454 represents an output unit including a display unit for recognizing an input character to indicate which character is input. Reference character 455 represents a communication unit for data transmission/reception to perform an original function of the mobile phone. Reference numeral 456 represents a device equipped with an interface unit capable of connecting to a digital camera and an external appliance.

Handwriting recognition is implemented by a method of analyzing and recognizing data pointed by the pointing device and recognizing the analyzed results as meaning data or an execution command, if the pointed data is input to the CPU of the mobile phone.

Handwriting operation data, based on relative coordinate values of end points to start points of respective strokes at the time of handwriting operation, are prestored with respect to each character. On the basis of relative coordinate values of strokes sequentially input from start points thereof, corresponding strokes are found from data of prestored characters (including symbols), thus recognizing the character.

The control unit 451 performs a function of recognizing a character by obtaining data on respective strokes of a character input to the input unit 450, searching the data storage unit 452 for the strokes and sequentially finding the strokes. Further, the input unit can receive data related to an input button, a send button, a cancel button and up/down selection buttons to quickly execute a command, such as a phonebook search. The data storage unit stores phonebook data and data for other usages together with stroke data. The output unit includes a display unit for displaying data on a screen and a voice output unit. An additional device is equipped with an interface unit for connecting to an external appliance including a digital camera.

FIG. 19 shows a method of inputting Hangul characters, and FIG. 21 shows a method of inputting gesture commands corresponding to special keys, numeric keys and Hangul/English mode conversion keys. FIG. 22 shows an example of a method of inputting English characters and numeric characters.

A method of inputting a word "handwritten" according to above method is shown in FIG. 20.

If an initial letter of a key word, or only the initial letter and a letter next thereto are input to increase the search efficiency when a phonebook of a mobile phone is searched, a key word input time is shortened to perform a quick search operation. Therefore, there is greater convenience in that, if a name similar to the key word exists in the phonebook, a call is directly placed or placed after a selecting operation. For example, in the case of "James Martin", only "JM" or "JAMA" is input to perform a search operation.

One example of the operating method of the mobile phone is described below. That is, after a phonebook input button of a mobile phone is pressed, a handwriting operation using the pointing function is recognized, and at each instant one stroke is input and recognized, recognized results are displayed on a display window. After the input of a key word has been completed, a search button is pressed to perform an operation for searching the phonebook. If the searched results of the phonebook have one item, a send command is immediately executed, while if the searched results have two or more items, the send button is pressed to place a call after a corresponding item is selected using up/down selection buttons.

FIG. 23 illustrates an embodiment of a pointing device 470 applied to a mobile phone 460, in which the pointing device 470 is mounted on the position of an antenna. Since a recent screen display unit 461 functions to rotate at 180°, there is greater convenience in allowing a user to operate while viewing the screen. The mobile phone 460 and the pointing device 470 are connected through a hinge 469, thus adjusting the angle of the pointing device at the time of handwriting operation. For convenience of utilization, an input button 465, a search button 466, a cancel button 467, a send button 468, an up selection button 463 and a down selection button 464 may be provided on the outside of the mobile phone. Among the buttons, the input and cancel buttons 465 and 467 may be implemented as a single button and used in a toggle manner. The search and send button 466 and 468 may also be combined into a single button. In this way, the number of buttons can be decreased. FIG. 24 shows that the pointing device is placed at a lower end of the mobile phone and it can be operated while a cover of the mobile phone is opened.

FIG. 25 is a flowchart of an operating method sequentially performing a phonebook input operation, a search operation, a selecting operation and a calling operation through handwriting input in the mobile phone.

If the input button is pressed at step 500, a message "please enter a handwritten character" is immediately displayed on a screen, and step 501 of receiving stroke data is executed. At step 501, data corresponding to one stroke is received from the pointing device, and then recognized and processed. In the stroke data recognition of step 501, recognition and processing for a character (consonant, vowel and numeral) is executed. At step 502 of performing a character determining operation, it is determined whether the processed results at step 501 represent a character. If the processed results represent a character, step 504 is executed, while if the processed results do not represent a character, step 503 is executed. At step 503, it is checked whether the cancel button has been pressed. If the cancel button has been pressed, a current operation ends; otherwise, the operation returns to step 501. Step 504 represents a character forming operation that forms a character on the basis of input data. At this time, English characters, numeric characters and the like are processed. The recognized results of the character, processed and formed at step 504, are immediately displayed on the screen through a character display operation at step 505. After displaying the character, step 506 is executed. At step 506, it is determined whether the search button has been pressed. If the search button has been pressed, step 511 is executed; otherwise, a stroke data recognizing operation of step 507 is executed, and then step 508 is executed. At step 508, if the recognized results at step 507 represent a character, the character forming operation of step 504 is executed again, while if the recognized results do not represent a character, step 509 is executed. At step 509, if it is determined whether the recognized results represent a search command of gesture commands. If the recognized results represent the search command, a search operation is executed at step 511; otherwise, a typical gesture command of FIG. 20 is executed at step 510. After step 510, the stroke data recognizing operation is executed at step 507. At step 511, a phonebook is searched for corresponding data with reference to the recognized character, the searched results are output, and then step 512 is executed. At step 512, if correspond data exists in the phonebook, step 513 is executed; otherwise, a current operation ends. At step 513, it is determined whether an up or down selection button has been pressed. If the up or down selection button has been pressed, an operation of selecting data next or previous to the data searched at step 511 is executed at step 514. If the up or down selection button is has not been pressed, step 515 is executed. At step 515, if a send button has been pressed, a call is placed to a user corresponding to the phonebook data currently selected at step 516 and then the operation ends. If the send button has not been pressed, step 517 is executed. At step 517, if the cancel button has been pressed, the operation ends; otherwise, step 514 is executed again.

Reference index data of phonebook search data can be constructed to immediately find corresponding data at the time of inputting a key word so as to improve the efficiency of an input operation in the above operations.

Hereinafter, still another application embodiment of the pointing device of the present invention is described.

An electronic dictionary is constructed so that a handwritten character recognition function, an electronic dictionary function and a display unit are provided to the pointing device to display dictionary contents corresponding to a word consisting of recognized characters on the display unit, which is described below.

FIG. 26 illustrates the recognized results and dictionary contents thereof after inputting 'd', 'e', 'v', 'i', 'c' and 'e' in a handwriting manner to the electronic dictionary having the above functions. Reference numeral 550 represents an electronic dictionary, 551 represents a display unit, 552 represents a button for executing an end command or a dictionary search command after handwriting input, and 553 represents a function button that functions as left and right click buttons of a typical mouse. Reference numeral 554 represents a button for performing a scroll function on a screen. Reference numeral 556 represents an example of a handwriting operation to recognize an English word "device", especially showing the track of the handwriting operation.

FIG. 27 illustrates an embodiment of a system block diagram of the above device equipped with the handwritten character recognition function, the electronic dictionary function and the display unit. Reference numeral 560 represents an input unit including a pointing device that receives track data of a handwriting operation. In this case, input data is transmitted to a control unit 563. Reference numeral 563 represents the control unit including a CPU for recognizing and processing data related to a handwritten character, input from the input unit 560. At the time of recognizing and processing a handwritten character, a data storage unit 564 is referred to. Reference numeral 564 represents the data storage unit in which reference data required to recognize characters and electronic dictionary contents are stored. Reference numeral 561 represents a button input unit for executing the operations of various buttons disposed on the outside of the device. A state in which each button is pressed is transmitted to the control unit 563. Reference numeral 562 represents an output unit including a display unit that displays recognized results of a handwritten character and corresponding dictionary contents. Reference numeral 565 represents a communication unit for transmitting/receiving data for a pointing function or other functions.

When data input from the input unit 560 including the pointing device has been input to the control unit 563 including the CPU, the control unit 563 executes processing in such a way that it analyzes and recognizes the input data to recognize the input data as meaning data. Whenever each character is recognized, the recognized results are displayed on a display window. Further, in order to end the recognition, the end button is pressed. After the recognition has ended, a recognized word is used as a key word, the electronic dictionary is searched for contents corresponding to the key word, and the searched results are displayed on the display unit.

The data input through the input unit 560, such as the pointing device, is comprised of track data on the movement (handwriting operation) of the device, in which data ranging from PEN_DOWN to PEN_UP forms a single stroke. The recognition of a stroke is carried out by analyzing the structure of the track of the stroke. Further, the recognition of a character is carried out by analyzing a relationship between consecutive strokes and the formation state of the character. The recognition of a stroke is performed in such a way that, in the case of Hangul character "ㄱ", it is determined whether a track component exists in a horizontal direction across a certain distance and then another track component exists in a downward direction extending from a bent. Handwriting rules for handwritten character recognition are described above.

Hereinbefore, the application embodiment of the pointing device of the present invention is described. However, a typical digital pen can also be applied to the electronic dictionary. That is, since a required word can be easily input using an input pen, the utilization of the electronic dictionary can be more increased.

As described above, the present invention provides a mouse in which a low-priced typical optical image sensor is mounted, and a simple device for detecting the surface of a ball rotating at a front end of the sensor is additionally provided, thus implementing a stable pen-type mouse device, having sensitivity equal to that of a conventional mouse, using only a small ball with a diameter of only 7 mm. Therefore, the pen-type mouse of the present invention can replace a current expensive pen-type mouse device. Further, a low-priced convenient pen-type mouse can be easily implemented from a standpoint of human engineering.

Such a pen-type mouse is very suitable for a handwriting operation, and more simply implements a computer graphic function, such as drawing. Especially, since the pen-type mouse has convenience as a studying tool, such as by allowing a child to draw a picture or practice writing using a computer, and it is conveniently portable, the pen-type mouse can be utilized for a notebook computer. Even in the case of a notebook computer, since a touch pad-type mouse device is occasionally inconvenient to use, the value of the notebook can be increased if the pen-type mouse is basically mounted and used in the notebook computer.

Figure 31:
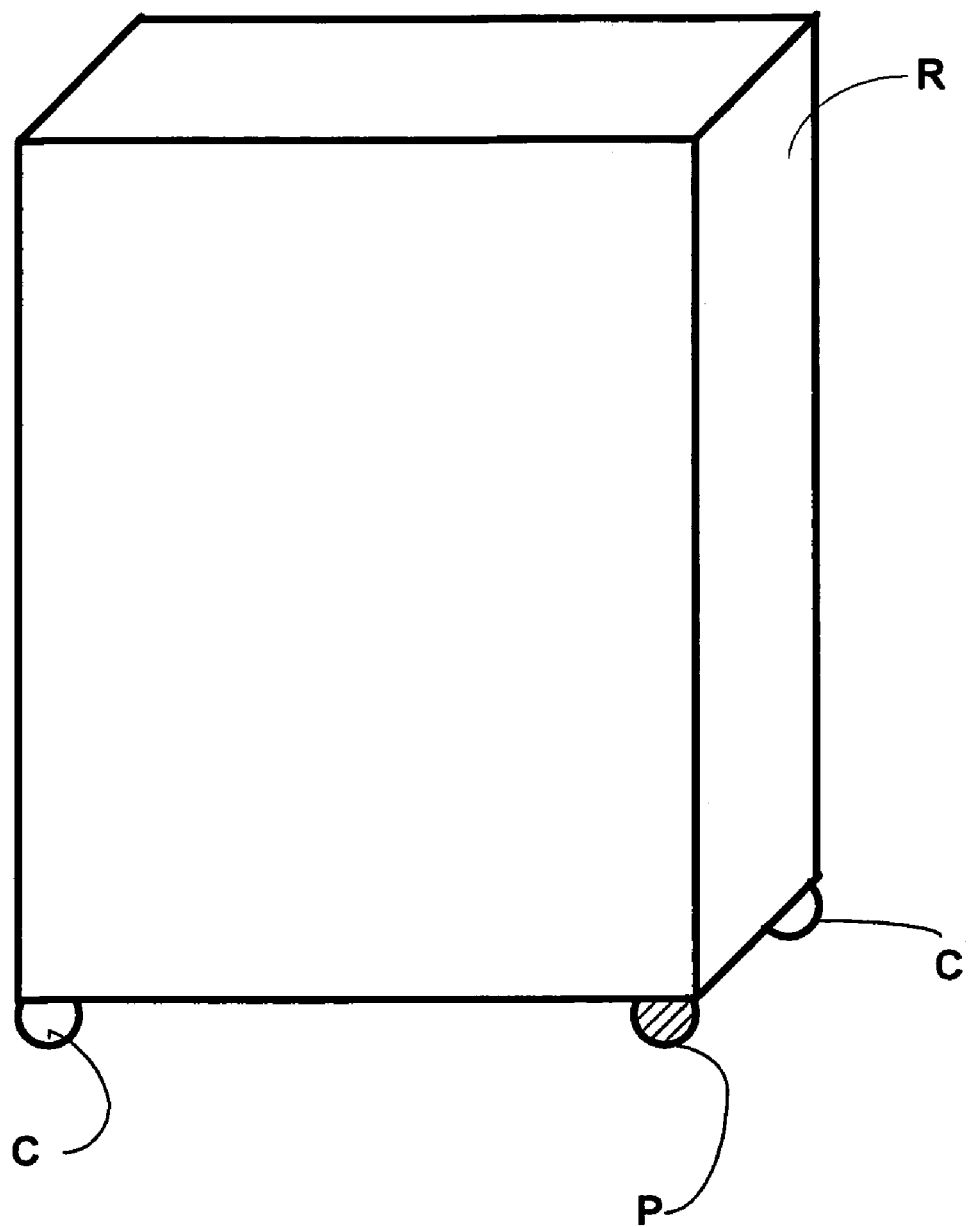
FIG. 31 is a schematic diagram of a robot embodying the present invention.

FIG. 31 is a schematic diagram illustrating a robot R embodying the present invention. The robot R is represented as a three-dimensional block having three casters. C (only two are visible FIG. 31). A. fourth caster-like rolling device, P. is shown schematically in cross-hatched form. Device P is intended to include the elements of a pointing device such as shown, for example, in FIG. 2. Thus, when robot R moves, its direction and distance of movement may be measured by device P.

Further, the present invention is advantageous in that, in the case of a pen-type mouse, a user can move the mouse as if the user grasps a pen and writes, thus decreasing discomfort felt by a human body.

Further, the present invention is advantageous in that the movement of the pen-type mouse can be precisely recognized even though the mouse declines at an arbitrary angle.

Further, the present invention is advantageous in that a ball of the pen-type mouse comes into contact with only a plurality of bearing balls, thus obtaining excellent sensitivity.

Further, the present invention is advantageous in that the pen-type mouse can perform a mouse operation even on a glass plane or a uniform-colored smooth material on which a conventional optical mouse was not operated.

Further, the present invention is advantageous in that, since the pen-type mouse requires only a small region on which the mouse contacts, a pointing operation is possible on any position with a bent, such as the palm or the back of the hand. Therefore, the device of the present invention can be freely utilized anywhere without a mouse pad.

Further, the present invention is advantageous in that a light guide precisely guides light in a required direction and to a required position while minimizing light loss using an optical fiber, thus reducing current consumption due to lighting and suitably applying the pen-type pointing device to a mouse for low power consumption.

Further, the present invention is advantageous in that, since the pen-type pointing device employs a small ball, it is possible to implement a small pen-type pointing device, thus providing a pointing function together with an encoder function in a pen-type scan device.

Further, the present invention is advantageous in that, since a laser pointing device is provided at an upper end of the pointing device, the pen-type pointing device can be very effectively utilized as a pointing device for presentations.

Further, the present invention is advantageous in that a small pen-type pointing device is mounted on a mobile phone to provide a handwriting recognition function using a pointing function, thus providing key word input and search functions when a phonebook is searched, and further providing a handwriting memo function and a drawing function. Therefore, the pen-type pointing device can be differentiated from other products, and the value thereof can be enhanced.

Further, the present invention is advantageous in that the pointing device is provided with a handwritten character recognition function, an electronic dictionary function and a display unit, thus providing various functions, such as by displaying dictionary contents corresponding to a word consisting of recognized characters on the display unit.

Further, the present invention is convenient in that the pointing device is provided with a scroll button to perform the same function as a scroll function, performed using a wheel in a conventional wheel mouse, by moving the pointing device upward and downward while pressing the scroll button.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pointing device, comprising:
a light source for irradiating light along a light path;
a ball rotating by movement of the entire pointing device;
an optical image sensor for detecting the movement of the pointing device using an image;
a plurality of bearing balls arranged to come into contact with the ball, thus facilitating rotation of the ball;
a support for supporting the bearing balls to form a space being structured and arranged so as to permit at least one of the bearing balls, when contacting the ball, to
(i) move with respect to the support in the direction in which the ball rotates; and
(ii) rotate;
a guard for preventing the bearing balls from crossing the light path from the light source to the ball; and
wherein the pointing device irradiates light onto the ball through the light source, acquires an image formed on a surface of the ball through the optical image sensor, and outputs data on movement direction and distance of the ball by comparing and analyzing previous and current images.

2. The pointing device according to claim 1, wherein the space is designed so that a ring-shaped groove is formed in a lower portion of the space to allow the bearing balls to be movable along the ring-shaped groove when the ball rotates.

3. The pointing device according to claim 1 or claim 2, wherein the pointing device is a pen-type pointing device.

4. A scanner comprising the pointing device of claim 3, the pointing device being used as an encoder that detects a direction and a speed of an image scan device and utilizes the detected direction and speed as reference data when a scanned image is matched.

5. The pointing device according to claim 1 or claim 2, wherein the pointing device is a mouse-type pointing device.

6. The pointing device according to claim 1 or claim 2, wherein the bearing balls are permitted to move in two dimensions.

7. A robot comprising the pointing device of claim 1, the pointing device being used as a ball caster to be capable of measuring movement direction and distance of the robot when the robot moves.

8. A pointing device comprising;
a light source for irradiating light along a light path;
a ball rotating by movement of the entire pointing device; and
an optical image sensor for detecting the movement of the pointing device using an image;
a plurality of bearing balls arranged to come into contact with the ball, thus facilitating rotation of the ball;
a support for supporting the bearing balls to form a space being structured and arranged so as to permit at least one of the bearing balls, when contacting the ball, to
(i) move with respect to the support in the direction in which the ball rotates; and
(ii) rotate;
a guard for preventing the bearing balls from crossing the light path from the, light source to the ball; and
a switch to sense the pressure applied on the pointing device over predetermined values and to function as a selection button;
wherein the pointing device is a pen-type device; and
wherein the pointing device irradiates light onto the ball through the light source, acquires an image formed on a surface of the ball through the optical image sensor, and outputs data on movement direction and distance of the ball by comparing and analyzing previous and current images.

9. The pointing device according to claim 8, wherein the pointing device is divided into an external device and internal device;
the internal device containing the ball, the bearing balls, the light source and the optical image sensor; and wherein
the internal device presses the outer device when the inner device moves along the outer device.

10. The pointing device according to claim 9, further comprising a spring between the inner device and the outer device, and wherein the switch is engaged when the spring is pressed over the predetermined value.

11. A mobile communication device, comprising: a light source for irradiating light along a light path;
a ball rotating by movement of the entire pointing device; and
an optical image sensor for detecting the movement of the pointing device using an image;
a plurality of bearing balls arranged to come into contact with the ball, thus facilitating rotation of the ball;
a support for supporting the bearing balls to form a space being structured and arranged so as to permit at least one of the bearing balls, when contacting the ball, to
(i) move with respect to the support in the direction in which the ball rotates; and
(ii) rotate;
a guard for preventing the bearing balls from crossing the light path from the light source to the ball; and
wherein the pointing device is a pen-type device; and
wherein the pointing device irradiates light onto the ball through the light source, acquires an image formed on a surface of the ball through the optical image sensor, and outputs data on movement direction and distance of the ball by comparing and analyzing previous and current images.

12. A mobile communication device according to claim 11, further comprising an antenna, and wherein the pointing device is positioned in the antenna.

13. A mobile communication device according to claim 11, further comprising a hinge and wherein the pointing device is connected to the mobile communication device by the hinge.

14. A pointing device, comprising:
a light source for irradiating light;
a ball rotating by movement of the entire pointing device; and
an optical image sensor for detecting the movement of the pointing device using an image;
a plurality of bearing balls arranged to come into contact with the ball, thus facilitating rotation of the ball;
a support for supporting the bearing balls to form a space being structured and arranged so as to permit the center of the bearing balls to move with respect to both the center of the ball and the surface of the support;
a guard for preventing the bearing balls from crossing the light path from the light source to the ball; and
wherein the pointing device irradiates light onto the ball through the light source, acquires an image formed on a surface of the ball through the optical image sensor, and outputs data on movement direction and distance of the ball by comparing and analyzing previous and current images.

* * * * *

UNITED STATES PATENT AND TRADEMARK OFFICE
CERTIFICATE OF CORRECTION

PATENT NO. : 7,239,302 B2
APPLICATION NO. : 10/653277
DATED : July 3, 2007
INVENTOR(S) : In-Gwang Kim It is certified that error appears in the above-identified patent and that said Letters Patent is hereby corrected as shown below:

At column 4, line 27, delete "and" after "processing"
At column 19, line 64, delete the "." after "casters" and replace it with --,--
At column 19, line 66, delete the "." after "P" and replace it with --,--
At column 21, line 60, delete "," after "the"

Signed and Sealed this

Twenty-seventh Day of May, 2008

JON W. DUDAS
*Director of the United States Patent and Trademark Office*